United States Patent
Murai et al.

(10) Patent No.: US 11,135,642 B2
(45) Date of Patent: Oct. 5, 2021

(54) METHOD FOR MANUFACTURING RING-ROLLED PRODUCT

(71) Applicant: HITACHI METALS, LTD., Tokyo (JP)

(72) Inventors: Takuya Murai, Tokyo (JP); Takanori Matsui, Tokyo (JP); Yuji Ishiwari, Tokyo (JP); Tomoyoshi Kiwake, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 590 days.

(21) Appl. No.: 15/779,760

(22) PCT Filed: Dec. 1, 2016

(86) PCT No.: PCT/JP2016/085824
§ 371 (c)(1),
(2) Date: May 29, 2018

(87) PCT Pub. No.: WO2017/094863
PCT Pub. Date: Jun. 8, 2017

(65) Prior Publication Data
US 2020/0306817 A1    Oct. 1, 2020

(30) Foreign Application Priority Data
Dec. 3, 2015   (JP) .............................. JP2015-236690

(51) Int. Cl.
*B21H 1/06*        (2006.01)
*B21B 5/00*        (2006.01)
(Continued)

(52) U.S. Cl.
CPC ................. *B21H 1/06* (2013.01); *B21B 5/00* (2013.01); *B21B 27/106* (2013.01);
(Continued)

(58) Field of Classification Search
CPC ... B21H 1/06; B21H 1/10; B21H 1/12; B21H 1/22; B21D 53/16; C21D 1/42
(Continued)

(56) References Cited

U.S. PATENT DOCUMENTS 3,859,830 A * 1/1975 Jeuken ..................... B21H 1/06
72/8.3
4,126,029 A   11/1978 Mathur
(Continued)

FOREIGN PATENT DOCUMENTS

JP    53-87970 A    8/1978
JP    59-212107 A   1/1984
(Continued)

OTHER PUBLICATIONS

Masao, translation of JPH01237036 (Year: 1989).*
(Continued)

*Primary Examiner* — Gregory D Swiatocha
*Assistant Examiner* — Bobby Yeonjin Kim
(74) *Attorney, Agent, or Firm* — Myers Bigel, P.A.

(57) ABSTRACT

A method for manufacturing a ring-rolled product, which manufactures the ring-rolled product from a ring material, includes a step of rolling the ring material, which has an operation of rolling the ring material from both inner and outer circumferential sides thereof between a mandrel roll and a main roll in a state of rotating the ring material toward one side in a circumferential direction thereof, and induction-heating the ring material by induction heating elements. An induction heating element is disposed on only an outer circumferential side of the ring material or is disposed on each of both the inner and outer circumferential sides in a region immediately before the rolling, or an inclined portion is provided in an outer-peripheral edge portion of a coil in the induction heating element.

6 Claims, 6 Drawing Sheets

(51) Int. Cl.
  *B21B 27/10* (2006.01)
  *B21H 1/22* (2006.01)
(52) U.S. Cl.
  CPC ... *B21B 2027/103* (2013.01); *B21B 2267/065* (2013.01); *B21B 2269/16* (2013.01); *B21H 1/22* (2013.01)
(58) Field of Classification Search
  USPC .......................... 72/69, 105–107, 110, 342.1
  See application file for complete search history.

(56) References Cited

U.S. PATENT DOCUMENTS

| | | | |
|---|---|---|---|
| 4,150,279 A | | 4/1979 | Metcalfe et al. |
| 4,830,683 A | | 5/1989 | Ferguson |
| 6,498,324 B2 | | 12/2002 | Yamamoto et al. |
| 2012/0279268 A1* | | 11/2012 | Loveless ................... B21B 5/00 72/69 |
| 2014/0157851 A1* | | 6/2014 | Takizawa ................. B21K 1/28 72/206 |

FOREIGN PATENT DOCUMENTS

| | | | | |
|---|---|---|---|---|
| JP | H01237036 | * | 9/1988 | ............... B21H 1/06 |
| JP | 1-237036 A | | 9/1989 | |
| JP | H01237036 | * | 9/1989 | ............... B21H 1/06 |
| JP | 5-329569 A | | 12/1993 | |
| JP | 05329569 A | * | 12/1993 | ............... B21H 1/06 |
| JP | 6-198375 A | | 7/1994 | |
| JP | 2008-25780 A | | 2/2008 | |
| JP | 2008025780 A | * | 2/2008 | ............... B21H 1/06 |

OTHER PUBLICATIONS

Kobayashi, Translation of JP-2008025780-A (Year: 2008).*
Ishihara, Translation of JP-05329569-A (Year: 1993).*
Hirono, Translation of JPH01237036 (Year: 1988).*
International Search Report with English language translation, International Application No. PCT/JP2016/085824, dated Jan. 24, 2017, 5 pp.
Written Opinion, International Application No. PCT/JP2016/085824, dated Jan. 24, 2017, 4 pp.
International Search Report with English language translation, International Application No. PCT/JP2016/085825, dated Jan. 24, 2017, 5 pp.
Written Opinion, International Application No. PCT/JP2016/085825, dated Jan. 24, 2017, 3 pp.

* cited by examiner

METHOD FOR MANUFACTURING RING-ROLLED PRODUCT

RELATED APPLICATIONS

This application is a 35 U.S.C. § 371 national stage application of PCT Application No. PCT/JP2016/085824, filed on Dec. 1, 2016, which itself claims priority from Japanese Patent Application No. 2015-236690, filed on Dec. 3, 2015, the contents of both of which are incorporated herein by reference in their entireties. The above-referenced PCT International Application was published as International Publication No. WO 2017/094863 A1 on Jun. 8, 2017.

TECHNICAL FIELD

The present invention relates to a method for manufacturing a ring-rolled product, the method forming a ring-rolled product from a ring material by using rolling, the rolling including an operation of rolling the ring material from both inner circumferential and outer circumferential sides thereof, between a mandrel roll and a main roll in a state of rotating the ring material in a circumferential direction thereof.

BACKGROUND ART

In a gear, a rotary element of rotation mechanism, or the like which is used in the various industrial fields, a ring-shaped component (hereinafter, referred to as "ring components") is used. In many cases, the ring component is manufactured by rolling a ring-shaped rolled product (hereinafter, referred to as "ring-rolled product"). The ring-rolled product is manufactured by applying ring rolling to a ring-shaped material (hereinafter, referred to as a "ring material"). In the ring rolling, a rolling device such as a ring-rolling mill, is used. In a typical ring rolling, inner and outer circumferential surfaces of the ring material are respectively rolled by a mandrel roll and a main roll while the ring material which is heated in advance, is rotated in a circumferential direction thereof, and furthermore, one or both of the mandrel roll and the main roll is or are moved in a ring radial direction with a center of the ring material in the radial direction as a reference so that the ring material is deformed so as to enlarge the diameter thereof.

However, when the temperature of the ring material, which is heated in advance, is decreased during ring rolling, the quality such as the dimensional accuracy of the ring-rolled product which is to be manufactured, may be reduced. In particular, this is a problem when manufacturing a ring component which requires the strict dimensional control, such as turbine disks for use in a gas turbine, a vapor turbine, or a jet engine of aircraft. Therefore, a ring material is heated at the time of ring rolling, and it is a common method for heating the ring material during ring rolling that an induction heating coil or the like induction-heats the ring material.

As an example of the ring rolling, there is ring rolling that a ring rolling mill includes: a mandrel roll and a main roll (a middle roll and a main roll) which respectively roll inner and outer circumferential surfaces of the ring material; a pair of axial rolls (edge rolls) which presses both end surfaces in an axial direction of the ring material; and an induction heating coil (heating electrode) which surrounds an entire circumference of a cross-section of the ring material, and in a region immediately after the ring material passes through the axial rolls, an induction heating coil induction-heats the ring material (for example, refer to Patent Literature 1).

As another example of ring rolling, there is ring rolling that a ring rolling mill (a forming device for a metal ring product) includes: a mandrel roll and a main roll (inner circumferential and outer circumferential forming rolls) which respectively roll inner and outer circumferential surfaces of a ring material (a ring element); and an induction heating coil which is formed into a U-shape so as to face the entirety of the outer circumferential surface of the ring material and both end surfaces of the ring material in an axial direction thereof, and the induction heating coil induction-heats the ring material in an entire region along the ring material, except for vicinities of the mandrel roll and the main roll (for example, refer to Patent Literature 2).

As yet another example of ring rolling, there is ring rolling that a ring rolling mill (a rolling forging device) includes: a mandrel roll and a main roll (a free play roll and a drive roll) which respectively roll the inner and outer circumferential surfaces of the ring material (the ring element); a pair of axial rolls which presses both end surfaces in the axial direction of the ring material; a magnetic core which is formed into a C-shape so as to face an outer circumferential surface of the ring material and both end surfaces thereof in the axial direction thereof; and an induction heating element which has an induction heating coil (solenoid coil) being wound on the magnetic core, and the induction heating coil induction-heats the ring material in a region immediately after the ring material passes through the axial rolls (For example, refer to Patent Literature 3.).

CITATION LIST

Patent Literature

[Patent Literature 1] Japanese Patent Application Publication No. H01-237036

[Patent Literature 2] Japanese Patent Application Publication No. H05-329569

[Patent Literature 3] Specification of U. S. Patent Application Publication No. 2012/0279268

SUMMARY OF INVENTION

Technical Problem

However, a ring material is deformed according to advancing ring rolling so that the distance between the induction heating coil and the ring material is changed. Consequently, when the induction heating coil heats the ring material as in each of the above examples of the ring rolling, it is difficult to control the distance between the induction heating coil and the ring material, and it is difficult to control the temperature distribution of the ring material within the appropriate temperature range.

Furthermore, in the ring rolling, the temperature of the outer circumferential side region of the ring material tends to be lower than the temperature of the inner circumferential side region. However, in the above example of the ring rolling, the entire circumference of the cross-section of the ring material is merely induction-heated so that the difference between inner and the outer circumference temperatures of the ring material remains, and it may occur that during the ring rolling, the temperature distribution of the ring material in the radial direction cannot be controlled within the appropriate temperature range. In particular, in the structure in which the induction heating coil surrounds the entire circumference of the cross-section of the ring material, it is more difficult to control within this temperature range when the distance between the induction heating coil and the ring material which deforms during ring rolling, is changed. Furthermore, in this structure, in a case of rolling the ring material so as to enlarge the ring material during ring rolling, the final rolled shape of the ring material and the reduction thereof are restricted depending on a shape, a size, and/or the like in the induction heating coil which surrounds the entire circumference of the cross-section of the ring material.

In the above another example of the ring rolling and the above yet another example thereof, both the inner and outer circumferential sides of the ring material are induction-heated so that the difference between the inner and outer circumferential temperature of the ring material remains, and it may occur that the temperature distribution of the ring material in the radial direction cannot be controlled within the appropriate temperature range. This matter reduces the dimensional accuracy of the ring-rolled product which is to be manufactured, the matter causes the cracking in the ring material, or the matter makes it impossible to obtain a desired plastic strain, and therefore, this is not preferable. Furthermore, in the ring rolling, it tends to be difficult to control the temperature distribution of the ring material in the axial direction within the appropriate temperature range. Consequently, it is desired to efficiently control the temperature distribution of the ring material in the ring rolling within the appropriate temperature range.

In addition, when the ring material is pressed between the pair of axial rolls from both sides thereof in the axial direction, the temperature distribution of the ring material is irregular due to the influence of the friction heat which occurs between the axial rolls and the ring material, the influence of the heat transfer to the axial rolls from the ring material, the influence of the processing heat of the ring material, and/or the like. Consequently, it is difficult to control the temperature of the ring material in the region immediately after the ring material passes through the axial rolls. However, in the above example of the ring rolling and the above yet another example thereof, the ring material is induction-heated in the region immediately after the ring material passes through the axial rolls. As a result, it may occur that the temperature distribution of the ring material cannot be controlled within the appropriate temperature range. Furthermore, in the ring rolling, there is a case in which the ring material being rotated may be held by a guide roll and/or the like in the vicinity of the main roll. In this case, it may occur that the temperature distribution of the ring material cannot be controlled within the appropriate temperature range, according to the influence of the heat transfer from the ring material to the guide roll and/or the like, although not as much as the influence of the axial rolls.

The present invention was made in the view of the above-described circumstances, and an object of the present invention is to provide a method for manufacturing a ring-rolled product which can efficiently control the temperature distribution of the ring material in ring rolling within the appropriate temperature range, and can efficiently enhance the quality of a ring-rolled product manufactured by using this ring rolling as a result.

Solution to Problem

To solve the problem, regarding a method for manufacturing a ring-rolled product according to one aspect of the present invention, the method is a method for manufacturing a ring-rolled product, the method forming the ring-rolled product from a ring material by using a rolling device, the rolling device including a mandrel roll, a main roll, and at least one induction heating element, the mandrel roll and the main roll being rotatable, the mandrel roll and the main roll being configured so as to contact inner and outer circumferential surfaces of the ring material respectively in a state in which the ring material is rotated in a circumferential direction thereof, the mandrel roll and the main roll being configured so as to press the ring material in a radial direction thereof, the at least one induction heating element being configured so as to induction-heat the ring material, wherein the at least one induction heating element includes an outer circumferential side induction heating element which is disposed on an outer circumferential side of the ring material so as to induction-heat an outer circumferential side region of the ring material, and furthermore, when seen from an axial direction of the ring material, a center of the outer circumferential side induction heating element in a direction which corresponds to a circumferential direction of the outer circumferential side region of the ring material, is disposed within a region immediately before inner and outer circumferential rolling, which is sandwiched in a circumferential direction of the ring material by a reference line segment and a boundary line segment, the reference line segment connecting a rotation axis of the ring material and a rotation axis of the main roll in a radial direction of the ring material, the boundary line segment being so as to be rotated around the rotation axis of the ring material from the reference line segment toward a direction opposite of a rotation direction of the ring material, by the angle of 90 degrees or less.

Regarding a method for manufacturing a ring-rolled product according to one aspect of the present invention, the method is a method for manufacturing a ring-rolled product, the method forming the ring-rolled product from a ring material by using a mandrel roll, a main roll, and at least one induction heating coil, the mandrel roll and the main roll being rotatable, the mandrel roll and the main roll being configured so as to respectively contact inner and outer circumferential surfaces of the ring material in a state in which the ring material is rotated in a circumferential direction thereof, the mandrel roll and the main roll being configured so as to press the ring material in a radial direction thereof, the at least one induction heating coil including a winding wire which is wound in a circulating manner, the at least one induction heating coil being configured so as to induction-heat the ring material, wherein an outer-peripheral edge portion of the induction heating coil has at least one inclined portion which is disposed along a direction inclined relative to a circumferential direction of the ring material or an axial direction thereof.

Regarding a method for manufacturing a ring-rolled product according to one aspect of the present invention, the method is a method for manufacturing a ring-rolled product, the method forming the ring-rolled product from a ring material by using a mandrel roll, a main roll, and at least one induction heating coil, the mandrel roll and the main roll being rotatable, the mandrel roll and the main roll being configured so as to respectively contact inner and outer circumferential surfaces of the ring material in a state in which the ring material is rotated in a circumferential direction thereof, the mandrel roll and the main roll being configured so as to press the ring material in a radial direction thereof, the at least one induction heating coil including a winding wire which is wound in a circulating manner, the at least one induction heating coil being configured so as to induction-heat the ring material, wherein an outer-peripheral edge portion of the induction heating coil is inclined relative to a circumferential direction or an axial direction of the ring material by using a mechanism which is configured so as to be capable of changing the inclination of the induction heating coil relative to the circumferential direction of the ring material or the axial direction thereof.

Advantageous Effects of Invention

In the method for manufacturing a ring-rolled product according to the present invention, the temperature distribution of the ring material in the ring rolling can be efficiently controlled within the appropriate temperature range, and the quality of the ring-rolled product which is manufactured by using the ring rolling, can be efficiently enhanced as a result.

DESCRIPTION OF EMBODIMENTS

Methods for manufacturing substantially ring-shaped rolled products (hereinafter, referred to as a "ring-rolled products") according to First to a Fifth Embodiments of the present invention will be described hereinafter with reference to FIGS. 1 to 15.

Note that the ring-rolled product is used to manufacture a component (hereinafter, referred to as "ring component") in a substantially ring shape. Although the following is only an example, the ring components can be a gear, a rotary element of a rotation mechanism, or the like which is used in the various industrial fields, and the ring component may preferably be a component which requires the strict dimensional management, in particular, a turbine disk for use in a gas turbine, a steam turbine, a jet engine of an aircraft, or the like. As an example, the diameter of an outer circumference of the ring-rolled product may preferably be from approximately 600 mm to approximately 2000 mm; however, the present invention is not limited to this, and it is possible to make the diameter of the outer circumference of the ring-rolled product smaller than approximately 600 mm and larger than approximately 2000 mm according to the ring component which is manufactured by using the ring-rolled product.

Furthermore, the ring-rolled product is formed by applying ring rolling to a material (hereinafter, referred to as a "ring material") formed in a substantially ring shape. The ring material can be manufactured by using a metal material which is excellent in the high temperature strength, the high temperature toughness, and/or the like. For example, the ring material can be manufactured by using a metal material selected from an Ni-based alloy, an Fe-based alloy, a Co-based alloy, a Ti-based alloy, and/or the like which are/is excellent in the high temperature strength, the high temperature toughness, and/or the like.

First Embodiment

A method for manufacturing a ring-rolled product according to a First Embodiment of the present invention will be described hereinafter.

<Rolling Device>

Figure 1:
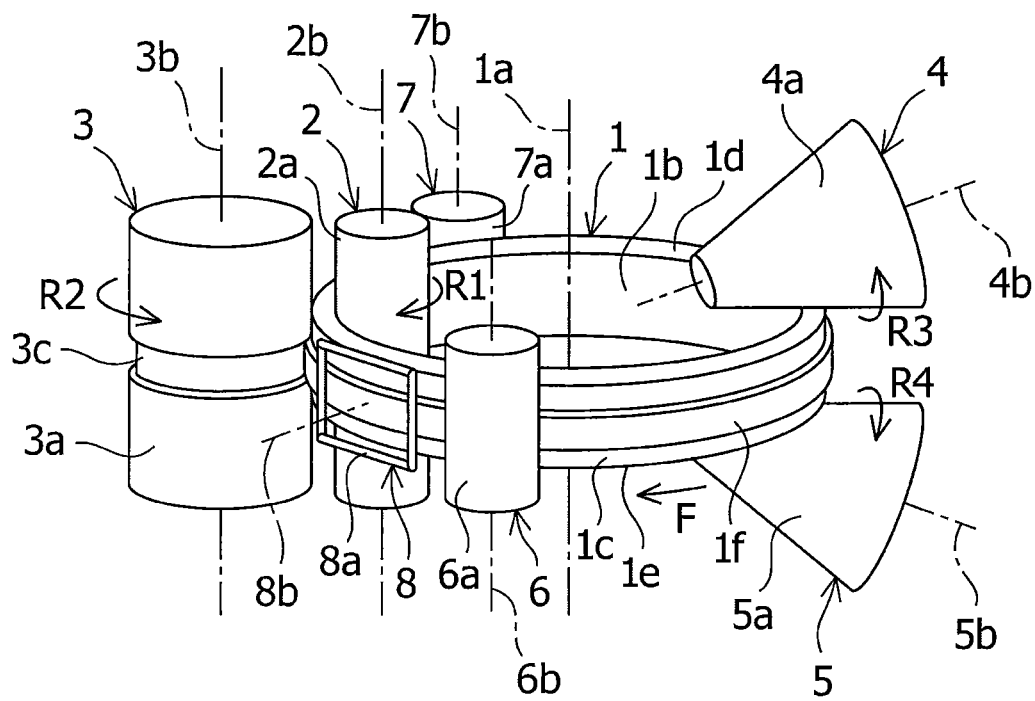
FIG. 1 is a perspective view schematically showing a rolling device which is used in a First Embodiment of the present invention.
Figure 2:
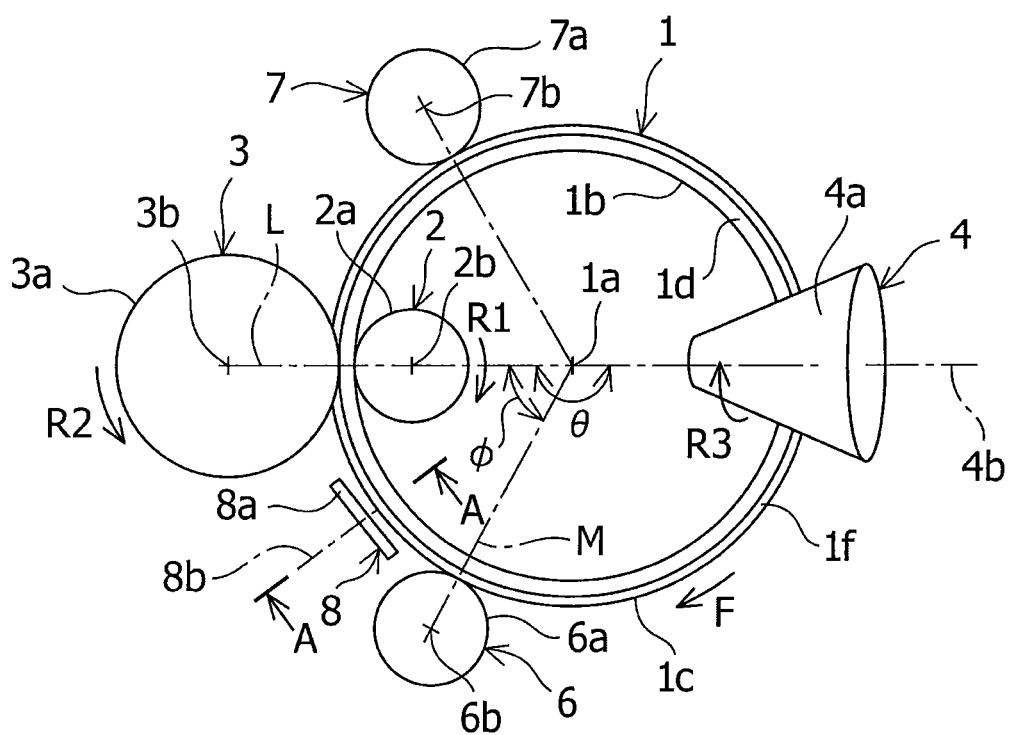
FIG. 2 is a plan view schematically showing the rolling device which is used in the First Embodiment of the present invention.
Figure 3:
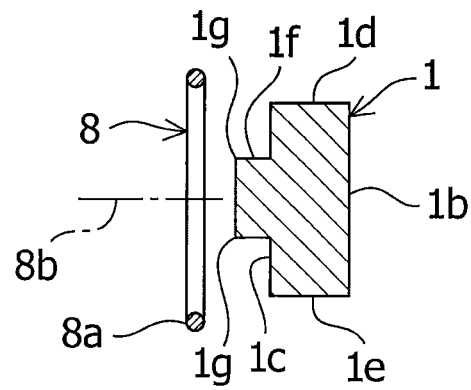
FIG. 3 is a diagram schematically showing a cross-section of a ring material and an induction heating coil in the First Embodiment of the present invention, which is cut along line A-A in FIG. 2.

First, an outline of a rolling device which is used in ring rolling will be described. As shown in FIGS. 1 and 2, the rolling device is configured such that a ring material 1 which is formed so as to be substantially rotationally symmetric with an axis 1a as a reference, can be fitted there to. This rolling device includes: a mandrel roll 2 and a main roll 3 which are configured so as to be respectively in contact with inner and outer circumferential surfaces 1b and 1c of the ring material 1 and are configured so as to press the ring material 1 in a radial direction thereof (hereinafter, referred to as a "ring radial direction"); and a pair of axial rolls 4 and 5 which are configured so as to be in contact with both end surfaces 1d and 1e in a direction of the axis 1a (hereinafter, referred to as a "ring axial direction") in the ring material 1 and are configured so as to press the ring material 1 in the ring axial direction. However, the present invention is also applicable to a rolling device which does not include the pair of axial rolls 4 and 5. The rolling device also includes two guide rolls 6 and 7 which are configured so as to be capable of contacting the ring material 1. The rolling device further includes an outer circumferential side induction heating element 8 which is configured so as to directly induction-heat the ring material 1.

<Mandrel Roll and Main Roll>

As shown in FIGS. 1 and 2, the mandrel roll 2 has a circumferential surface 2a which is configured so as to be contactable to an inner circumferential surface 1b of the ring material 1. The main roll 3 has a circumferential surface 3a which is configured so as to be contactable to an outer circumferential surface 1c of the ring material 1. These circumferential surfaces 2a and 3a are substantially rotationally symmetrical with rotation axes 2b and 3b as references respectively. The mandrel roll 2 and main roll 3 are respectively configured so as to be rotatable around the rotation axes 2b and 3b. One or both of the mandrel roll 2 and the main roll 3 may be preferably configured so as to be rotationally drivable by a drive mechanism (not shown). The mandrel roll 2 and the main roll 3 may be preferably configured such that the rotational speeds thereof are controllable as necessary. In particular, in the view of circumstances in which it is difficult for a space formed on an inner circumferential side of the ring material 1 to ensure a sufficient disposition space for the drive mechanism as compared with a space formed on an outer circumferential side of the ring material 1, the main roll 3 in between the mandrel roll 2 and the main roll 3 may preferably be configured so as to be rotationally drivable.

Note that "the inner circumferential side of the ring material 1" is defined as a range including the inner circumferential side region of the ring material 1 having a surface of the ring material 1 which contacts the mandrel roll 2. Note that "the outer circumferential side of the ring material 1" is defined as a range including the outer circumferential side region of the ring material 1 having the surface of the ring material 1 which contacts the main roll 3 and the pair of axial rolls 4 and 5, and is located closer to the outer circumference of the ring material 1 relative to the inner circumferential side region of the ring material 1.

The circumferential surfaces 2a and 3a of the mandrel roll 2 and the main roll 3 have shapes corresponding to the shape of the ring-rolled product which is to be manufactured. In FIGS. 1 to 4, the ring material 1 is formed so as to have one protruded portion 1f protruding from the outer circumferential surface 1c and extending along a circumferential direction of the ring material 1 (hereinafter, referred to as a "ring circumferential direction"). In FIGS. 1 and 2, the circumferential surface 3a of the main roll 3 is formed so as to have one recessed portion 3c corresponding to the one protruded portion if and extending along the circumferential direction of the main roll 3.

However, the outer circumferential surface of the ring material is not limited to this, and it may be formed so as to be substantially flat, it may be formed so as to have a portion with the diameter thereof which is varied along the ring axial direction, or it may be formed so as to have at least one of: one or more protruded portions; and one or more recessed portions. The circumferential surface of the main roll might be formed so as to correspond to this outer circumferential surface of the ring material. The inner circumferential surface of the ring material can be also formed in the same manner as this outer circumferential surface of the ring material, and the circumferential surface of the mandrel roll can be formed so as to correspond to this inner circumferential surface of the ring material.

Referring to FIGS. 1 and 2 again, the mandrel roll 2 and the main roll 3 are configured so as to be movable in the ring radial direction. The ring material 1 is rolled between the circumferential surfaces 2a and 3a of the mandrel roll 2 and the main roll 3. The rolling device is configured such that the ring material 1 can rotate in the ring circumferential direction in connection with rotating the mandrel roll 2 and the main roll 3. Note that in the method for manufacturing the ring-rolled product which will be described later, a case in which the ring material 1 rotates to one side (shown by an arrow F) of the ring circumferential direction in connection with rotating the main roll 3 to one side (shown by an arrow R2) of a rotation direction thereof and rotating the mandrel roll 2 to one side (shown by an arrow R1) of a rotation direction thereof, will be described.

<A Pair of Axial Rolls>

As shown in FIGS. 1 and 2, the pair of axial rolls 4 and 5 is disposed so as to be apart from the main roll 3 in the ring circumferential direction. The pair of axial rolls 4 and 5 can be disposed so as to be apart from the main roll 3 with a space of the angle θ around the axis 1a of the ring material 1. Typically, the angle θ may preferably be approximately 180 degrees, in other words, the pair of axial rolls 4 and 5 may preferably be disposed so as to apart from the main roll 3 with a space in the ring circumferential direction while being opposed to the main roll 3 in the ring radial direction. However, the angle θ is not limited to this and, as long as a high-quality ring-rolled product can be manufactured, the angle θ may be set within a range larger than approximately 0 degrees and smaller than approximately 360 degrees, the angle θ may be set within a range from approximately 90 degrees to approximately 270 degrees, or the angle θ may be set within a range from approximately 135 degrees to approximately 225 degrees.

The pair of axial rolls 4 and 5 respectively has circumferential surfaces 4a and 5a which are respectively configured so as to be contactable to both end surfaces 1d and 1e in the ring axial direction. These circumferential surfaces 4a and 5a are substantially rotationally symmetrical with rotation axes 4b and 5b as references respectively. The pair of axial rolls 4 and 5 is respectively configured so as to be rotatable around the rotation axes 4b and 5b. One or both of the paired axial rolls 4 and 5 may be preferably configured so as to be rotationally driven by a drive mechanism. The pair of axial rolls 4 and 5 may be preferably configured such that the rotational speeds thereof are controllable as necessary.

Each of the circumferential surfaces 4a and 5a of the paired axial rolls 4 and 5 has a shape corresponding to a shape of the ring-rolled product which is to be manufactured. The ring material 1 is rolled between the circumferential surfaces 4a and 5a of the axial rolls 4 and 5. The rolling device is configured such that the ring material 1 can rotate in the ring circumferential direction in connection with rotating the pair of axial rolls 4 and 5. Note that in the method for manufacturing the ring-rolled product, which will be described later, a case in which the ring material 1 rotates to one side (shown by the arrow F) of the ring circumferential direction in connection with rotating the axial roll 4 on one side to one side (shown by an arrow R3) of a rotation direction thereof and rotating the axial roll 5 on the other side to one side (shown by an arrow R4) of a rotation direction thereof, will be described.

<Guide Roll>

As shown in FIGS. 1 and 2, the guide roll 6 on one side between the two guide rolls 6 and 7, is disposed in a range which reaches the main roll 3 from the pair of axial rolls 4 and 5 toward one side (shown by the arrow F) of the ring circumferential direction. The guide roll 7 on the other side in between the two guide rolls 6 and 7, is disposed in a range which reaches the main roll from the pair of axial rolls 4 and 5 toward the other side of the ring circumferential direction.

The two guide rolls 6 and 7 respectively have circumferential surfaces 6a and 7a which are configured so as to be contactable to the outer circumferential surface 1c of the ring material 1. These circumferential surfaces 6a and 7a are substantially rotationally symmetrical with the rotation axes 6b and 7b as references respectively. The two guide rolls 6 and 7 are configured so as to be rotatable around the rotation axes 6b and 7b respectively. The two guide rolls 6 and 7 can hold the ring material 1 which rotates in the ring circumferential direction while contacting the outer circumferential surface 1c of the ring material 1 and rotating around the rotation axes 6b and 7b respectively.

However, the present invention is not limited to this, and the rolling device can be configured so as to include no guide roll. On the other hand, when the rolling device is configured so as to include a guide roll, the rolling device can include at least the guide roll on one side as described above.

<Outer Circumferential Side Induction Heating Element>

As shown in FIGS. 1 to 4, the outer circumferential side induction heating element 8 includes an induction heating coil 8a which has a winding wire which is wound so as to make at least one turn, and the outer circumferential side induction heating element 8 is configured so as to generate the magnetic field for induction heating by passing an alternating current to the winding wire of the induction heating coil 8a. The outer circumferential side induction heating element 8 is also configured so as to be movable.

As shown in FIG. 2, when seen from the ring axial direction, a substantially center (hereinafter, referred to as a "circumferential direction center of the outer circumferential side induction heating element 8") of the outer circumferential side induction heating element 8 in a direction which corresponds to a circumferential direction of the outer circumferential side region of the ring material 1, is disposed in a position which is rotated by the angle of 90 degrees or less to the other side in the ring circumferential direction around the axis 1a of the ring material 1 relative to a reference line segment L, and the reference line segment L connects the axis 1a of the ring material 1 and the rotation axis 3b of the main roll 3 in the radial direction of the ring material 1. Furthermore, the outer circumferential side induction heating element 8 is located on only the outer circumferential side of the ring material 1.

In other words, the circumferential direction center of the outer circumferential side induction heating element 8 might be located in a region immediately before rolling by the mandrel roll 2 and the main roll 3 (hereinafter, referred to as a "region immediately before inner and outer circumferential rolling"). Here, the region immediately before inner and outer circumferential rolling is a region sandwiched in the ring circumferential direction by the reference line segment L and a boundary line segment M, and the boundary line segment M is rotated by the angle φ to the other side of the ring circumferential direction around the axis 1a of the ring material 1 relative to the reference line segment L. When it is considered to facilitate the temperature control of the ring material 1, the angle φ can be equal to or larger than the angle which enables the outer circumferential side induction heating element 8 to be disposed in the region immediately before inner and outer circumferential rolling, and the angle φ can be approximately 90 degrees or less. Furthermore, the angle φ may preferably be 60 degrees or less, or the angle 4) may further preferably be 45 degrees or less. In particular, the entire outer circumferential side induction heating element 8 can preferably be disposed in the region immediately before inner and outer circumferential rolling. This region immediately before inner and outer circumferential rolling is located between the main roll 3 and the guide roll 6 on one side in the ring circumferential direction, and the main roll 3 and the guide roll 6 on one side may preferably be located on both ends of the region immediately before inner and outer circumferential rolling in the ring circumferential direction respectively. Furthermore, a space in the ring circumferential direction between the main roll 3 and the outer circumferential side induction heating element 8 may preferably be smaller than a space in the ring circumferential direction between the pair of axial rolls 4 and 5, and the outer circumferential side induction heating element 8.

Note that the region immediately before inner and outer circumferential rolling can be also defined as follows. That is to say, the region immediately before inner and outer circumferential rolling can be defined as being located on the other side in the ring circumferential direction relative to the main roll 3 and being located on one side in the ring circumferential direction relative to a center in the ring circumferential direction between the main roll 3 and the pair of axial rolls 4 and 5. Furthermore, the region immediately before inner and outer circumferential rolling can be defined as being from the main roll 3 toward the other side in the ring circumferential direction and being located within a range of a length obtained by dividing a length in the ring circumferential direction between the main roll 3 and the pair of axial rolls 4 and 5 into two.

The rolling device may also include induction heating means other than the outer circumferential side induction heating element 8. However, if considering that the temperature of the ring material 1 is difficult to control in a region immediately after the ring material 1 passes through the pair of axial rolls 4 and 5, and considering the influence of the guide roll 6 at one side, the induction heating means which is disposed on the other side in the ring circumferential direction relative to the main roll 3 and is disposed between the main roll 3 and the pair of axial rolls 4 and 5, may preferably be only the outer circumferential side induction heating element 8. Furthermore, the induction heating means which is provided in the rolling device, may be only the outer circumferential side induction heating element 8.

As shown in FIGS. 1 to 4, the induction heating coil 8a is disposed such that it is apart from the outer circumferential surface 1c of the ring material 1 in the ring radial direction, and a direction of a winding axis 8b of the winding wire is directed to the outer circumferential surface 1c of the ring material 1. Furthermore, both end portions of the outer circumferential surface 1c of the ring material 1 in the ring axial direction are disposed in a range in which both the end portions are sandwiched by both end portions of the induction heating coil 8a in the ring axial direction. This induction heating coil 8a can induction-heat the outer circumferential surface 1c of the ring material 1, in particular, the surface of the ring material 1 which contacts the main roll 3, in the region immediately before inner and outer circumferential rolling. Furthermore, the induction heating coil 8a can induction-heat the outer circumferential side region of the ring material 1 in the region immediately before inner and outer circumferential rolling, and it can also induction-heat the surfaces of the ring material 1 which contact the pair of axial rolls 4 and 5.

However, the present invention is not limited to this, and the rolling device may have a plurality of outer circumferential side induction heating elements to facilitate the temperature control of the ring material more. Furthermore, if the outer circumferential surface or the outer circumferential side region of the ring material can be induction-heated in the region immediately before inner and outer circumferential rolling, the direction of the winding axis of the induction heating coil may be directed to other spots than the outer circumferential surface of the ring material. If the outer circumferential surface or the outer circumferential side region of the ring material can be induction-heated in the region immediately before inner and outer circumferential rolling, the outer circumferential side induction heating element may have a magnetic core on which the induction heating coil is wound, and in this case, the outer circumferential surface of the ring material on the line of the magnetic flux generated from the magnetic core is induction-heated.

Figure 4:
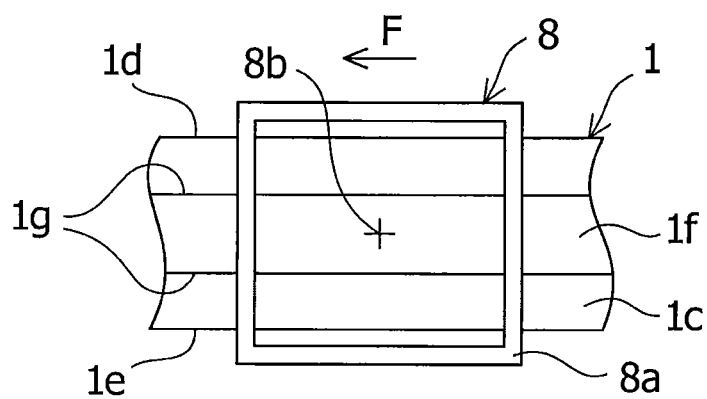
FIG. 4 is a front view schematically showing a part of the ring material and the induction heating coil in the First Embodiment of the present invention.

In FIGS. 1 and 4, an outer-peripheral edge portion of the induction heating coil 8a is formed in a substantially quadrangular shape when seen from the direction of the winding axis 8b. However, the outer-peripheral edge portion of the induction heating coil is not limited to this, and it can be also formed into a substantially circular shape, a substantially elliptical shape, a substantially polygonal shape other than the substantially quadrangular shape, and/or the like when seen from the direction of the winding axis. Furthermore, the number of turns of the induction heating coil 8a may preferably be more than one as necessary the density of the line of the magnetic force in the range which enables manufacturing of coil.

<Method for Manufacturing Ring-Rolled Product>

Next, the method for manufacturing a ring-rolled product will be described. In this method for manufacturing, the aforementioned rolling device ring-rolls the ring material 1 which is heated in advance. At this time, the temperature of the ring material 1 which is heated in advance, may preferably be in the range from approximately 850 degrees C. to approximately 1150 degrees C. However, the temperature is not limited to this, and it is adjustable according to the kind of the metal material which is used in the ring material to manufacture the ring-rolled product with the high quality.

As shown in FIGS. 1 and 2, in the ring rolling, the mandrel roll 2 and the main roll 3, and the pair of axial rolls 4 and 5 rotate. In connection with rotating them, the ring material 1 which is heated in advance, rotates to one side (shown by the arrow F) in the ring circumferential direction around the axis 1a. Furthermore, in a state in which the ring material 1 rotates, an operation of pressing the ring material 1 in the ring axial direction by the pair of axial rolls 4 and 5, an operation of induction-heating the outer circumferential surface 1c or the outer circumferential side region of the ring material 1 by the outer circumferential side induction heating element 8 which is disposed on the outer circumferential side of the ring material 1 in the region immediately before inner and outer circumferential rolling, and an operation of pressing the ring material 1 in the ring radial direction by the mandrel roll 2 and the main roll 3 are repeated in this order. At this time, one or both of the mandrel roll 2 and the main roll 3 is or are relatively moved in the ring radial direction with the center of the ring material 1 in the radial direction as a reference so that the ring material 1 can be deformed so as to enlarge the diameter thereof.

In this ring rolling, the temperature of the ring material 1 which is induction-heated by the outer circumferential side induction heating element 8, may preferably be set in the range from approximately 850 degrees C. to approximately 1150 degrees C. However, the temperature is not limited to this, and it can be adjusted such that the temperature distribution of the ring material in the radial direction can be controlled efficiently within the appropriate temperature range, and as an example, it can be adjusted such that the temperature distribution of the ring material in the radial direction is made uniform.

Operations and Effects

Regarding the method for manufacturing the ring-rolled product according to the present Embodiment, the outer circumferential surface 1c or the outer circumferential side region of the ring material 1 in which the temperature is easily reduced as compared with the inner circumferential side region of the ring material 1, is induction-heated in the region immediately before inner and outer circumferential rolling. Therefore, the temperature distribution of the ring material 1 in the radial direction can be efficiently controlled within the appropriate temperature range in the region of rolling between the mandrel roll 2 and the main roll 3 (hereinafter, referred to as the "inner and outer circumferential rolling region"), immediately after the ring material 1 passes through the region immediately before inner and outer circumferential rolling. As a result, the quality such as the dimensional accuracy of the ring-rolled product which is to be manufactured, can be efficiently enhanced. Furthermore, the temperature distribution between the surface and an interior of the ring material 1 can be restrained from being not uniform in connection with decreasing the temperature of the ring material 1. Therefore, the duplex grain can be restrained in the entire ring-rolled product which is to be manufactured. That is to say, sizing of crystal grains can be promoted in the entire ring-rolled product which is to be manufactured.

In particular, when the reduction of the ring material 1 in rolling by the pair of axial rolls 4 and 5 is low, the processing heat by the pair of axial rolls 4 and 5 cannot be sufficiently obtained, the surface of the ring material 1 which contacts the pair of axial rolls 4 and 5, is easily cooled, and as a result, the cracking and the reduction in the dimensional accuracy easily occur in the surface. On the other hand, the induction heating coil 8a can further induction-heat the outer circumferential side region of the ring material 1, in the region immediately before inner and outer circumferential rolling, and it can induction-heat the surface of the ring material 1 which contacts the pair of axial rolls 4 and 5. Therefore, the cracking and the reduction of the dimensional accuracy occurring at the surface can be prevented.

Regarding the method for manufacturing the ring-rolled product according to the present Embodiment, the space in the ring circumferential direction between the main roll 3 and the outer circumferential side induction heating element 8 is smaller than the space in the ring circumferential direction between the pair of axial rolls 4 and 5, and the outer circumferential side induction heating element 8. Consequently, when the outer circumferential side induction heating element 8 induction-heats the surface of the ring material 1, it can be difficult to be subject to the influence of, the frictional heat which is generated between the ring material 1 and the pair of axial rolls 4 and 5, the heat transfer to the pair of axial rolls 4 and 5 from the ring material 1, the processing heat of the ring material 1, and/or the like. As a result, the temperature distribution of the ring material 1 in the radial direction can be efficiently controlled within the appropriate temperature range.

Regarding the method for manufacturing the ring-rolled product according to the present Embodiment, the outer circumferential side induction heating element 8 is located between the main roll 3 and the guide roll 6 on one side. Consequently, even when the rolling device includes the guide roll, which is generally disposed in the vicinity of the main roll, the ring material 1 is rolled by the main roll 3, without passing through the guide roll immediately after the ring material 1 is induction-heated by the outer circumferential side induction heating element 8. As a result, the temperature distribution of the ring material 1 in the radial direction can be efficiently controlled within the appropriate temperature range.

Regarding the method for manufacturing the ring-rolled product according to the present Embodiment, to enhance the quality such as the dimensional accuracy of the ring-rolled product, it is efficient to properly manage the temperature of the outer circumferential surface 1c of the ring material 1 which contacts the circumferential surface 3a of the main roll 3, and this entire outer circumferential surface 1c of the ring material 1 is directly induction-heated in the region immediately before inner and outer circumferential rolling. Therefore, the temperature distribution of the ring material 1 in the radial direction can be efficiently controlled within the appropriate temperature range in the inner and outer circumferential rolling region.

In particular, in the ring rolling, since main working of the ring material 1 is rolling by the main roll 3, it is important to properly control the temperature of the outer circumferential surface 1c of the ring material 1 which contacts the main roll 3. Furthermore, in the ordinary rolling device, the volume of a die portion of the main roll 3 which is configured so as to form the ring material 1, tends to be larger than the volume of a die portion of the mandrel roll 2 which is configured so as to form the ring material 1. Furthermore, since the main roll 3 is located on the outer circumferential side of the ring material 1, a circumferential length of the main roll 3 is longer than a circumferential length of the mandrel roll 2, and an area of a surface of the ring material 1 which contacts the main roll 3, tends to be larger than an area of a surface of the ring material 1 which contacts the mandrel roll 2. Therefore, a quantity of heat which escapes from the surface of the ring material 1 in contact with the main roll 3, tends to be larger than a quantity of heat which escapes from the surface of the ring material 1 in contact with the mandrel roll 2. On the other hand, the induction heating coil 8a can induction-heat the entire outer circumferential surface 1c of the ring material 1, in the region immediately before inner and outer circumferential rolling, so that the quantity of heat which escapes from the surface of the ring material 1 in contact with the main roll 3 in this way, can be supplemented.

Specific Example of First Embodiment

Figure 14:
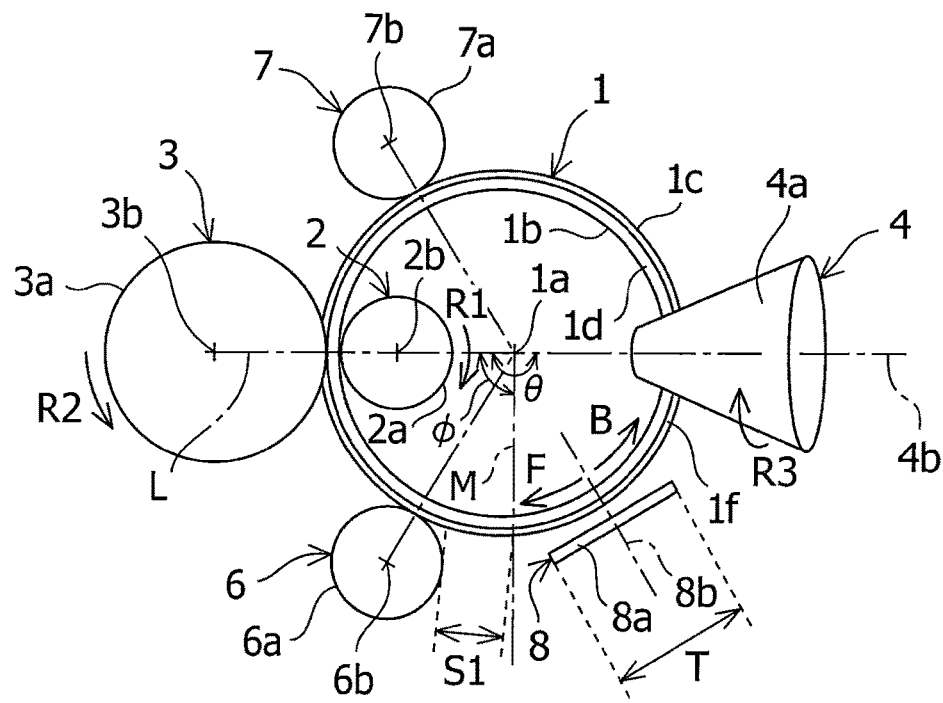
FIG. 14 is a plan view schematically showing a rolling device which is used in a Specific Example of the First Embodiment of the present invention in a state of a starting stage of ring rolling.
Figure 15:
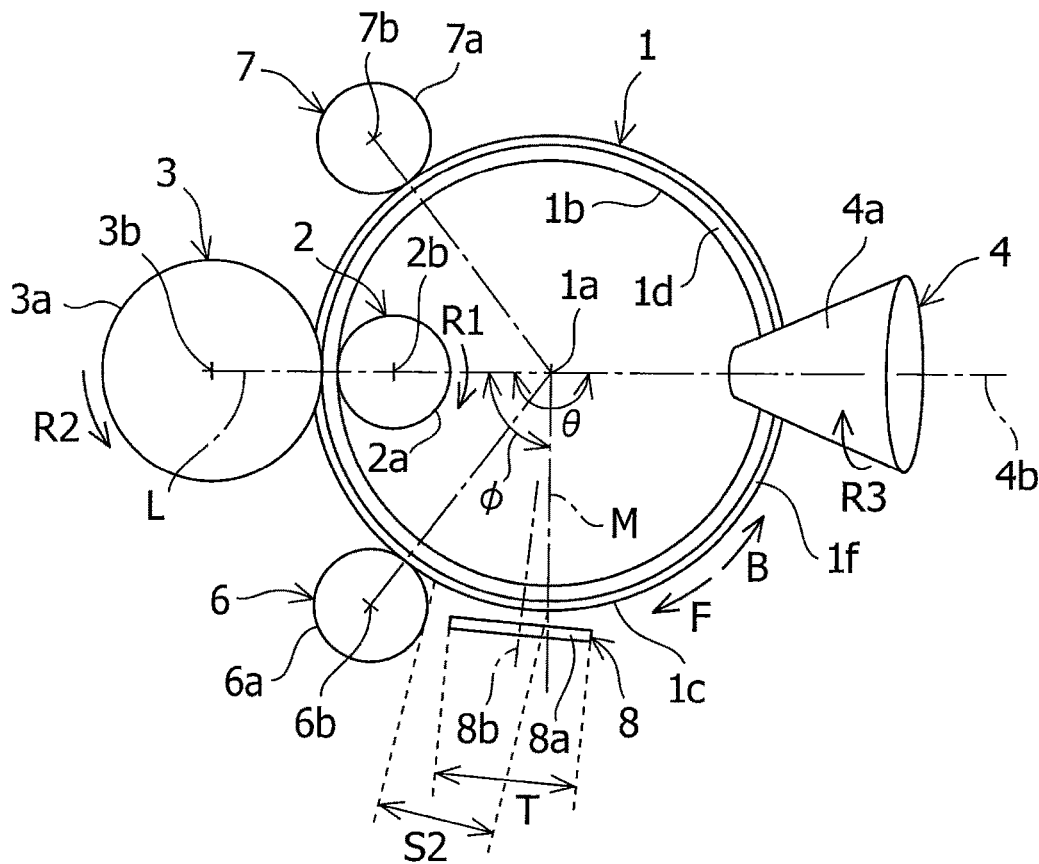
FIG. 15 is a plan view schematically showing the rolling device which is used in the Specific Example of the First Embodiment of the present invention in a state of a completing stage of the ring rolling.

As a Specific Example of the First Embodiment of the present invention, the outer circumferential side induction heating element 8 of the First Embodiment is further configured as follows, and the method for manufacturing the ring-rolled product can be carried out as follows by using the outer circumferential side induction heating element 8.
<Induction Heating Element>
As shown in FIGS. 14 and 15, the region immediately before inner and outer circumferential rolling, which relates to the outer circumferential side induction heating element 8, is located between the reference line segment L and the boundary line segment M in the ring circumferential direction. The guide roll 6 on one side is disposed in a middle of the region immediately before inner and outer circumferential rolling in the ring circumferential direction.

Furthermore, in the ring rolling, the diameter of the ring material 1 is enlarged according to advancing ring rolling from a starting stage of the ring rolling to a completing stage thereof. Consequently, at the starting stage of ring rolling as shown in FIG. 14, and further before an intermediate stage of the ring rolling, a length S1 of a space (hereinafter, referred to as a "heating element disposition space") which is located on the outer circumferential side of the ring material 1 and is between the guide roll 6 on one side and the boundary line segment M in the region immediately before inner and outer circumferential rolling, is half a length T of the outer circumferential side induction heating element 8 or less, in the ring circumferential direction, preferably in a direction of a tangential line which contacts the outer circumference of the ring material 1 (hereinafter, referred to as a "ring tangential line direction"). Meanwhile, at the completing stage of the ring rolling as shown in FIG. 15, and further after the intermediate stage of ring rolling, the length S2 of the heating element disposition space of the region immediately before inner and outer circumferential rolling is larger than half the length T of the outer circumferential side induction heating element 8, in the ring circumferential direction, preferably, in the ring tangential line direction. The ring tangential line direction can be more specifically defined as a direction which is along the tangential line which contacts the outer circumference of the ring material 1 at a position of the outer circumferential side induction heating element 8 in the ring circumferential direction or the position of the heating element disposition space in the ring circumferential direction.

As an example, a relationship between the lengths S1 and S2 of the heating element disposition space of the region immediately before inner and outer circumferential rolling, and the length T of the outer circumferential side induction heating element 8, can be defined as one provided when the diameter of the outer circumference of the ring material 1 at the starting stage of the ring rolling is approximately 700 mm or less. However, the present invention is not limited to this, and the above length relationship can be also provided, as a matter of course, when the diameter of the outer circumference at the starting stage of ring rolling is larger than approximately 700 mm according to the conditions of the rolling device, the ring rolling, and/or the like.

In this configuration, as shown in FIG. 14, before the intermediate stage of the ring rolling, a center of the outer circumferential side induction heating element 8 is disposed, in the ring circumferential direction, on the space which is on the outer circumferential side of the ring material 1 and is on the other side (shown by an arrow B) in the ring circumferential direction from the boundary line segment M. At this time, the distance in the ring radial direction between the ring material 1 and the outer circumferential side induction heating element 8 is maintained so as to enable induction heating. Meanwhile, as shown in FIG. 15, in the period from the intermediate stage to the completing stage of the ring rolling, the center of the outer circumferential side induction heating element 8 is disposed in the region immediately before inner and outer circumferential rolling. Specifically, in the period from the intermediate stage to the completing stage of ring rolling, the center of the outer circumferential side induction heating element 8 is disposed in the heating element disposition space in the region immediately before inner and outer circumferential rolling in the ring circumferential direction, preferably, in the ring tangential direction. At this time, the distance in the ring radial direction between the ring material 1 and the outer circumferential side induction heating element 8 is maintained to enable induction heating. As shown in FIGS. 14 and 15, this outer circumferential side induction heating element 8 is configured so as to be movable from the disposition position at the starting stage of the ring rolling to the disposition position at the completing stage, in the state in which the ring material 1 can be induction-heated.

However, the present invention is not limited to this, and the outer circumferential side induction heating element may be as follows. Before the intermediate stage of the ring rolling, the outer circumferential side induction heating element may be apart from the outer circumference of the ring material in the ring radial direction to avoid the guide roll on one side between the guide roll on one side which is on the outer circumferential side of the ring material, and the reference line segment. At this time, the outer circumferential side induction heating element may be in the state in which the outer circumferential side induction heating element, cannot induction-heat the ring material. If the length of the heating element disposition space in the region immediately before inner and outer circumferential rolling is larger than half the length of the outer circumferential side induction heating element in the ring circumferential direction, preferably, in the ring tangential direction, the outer circumferential side induction heating element can move so as to dispose the center of the outer circumferential side induction heating element in the region immediately before the inner and outer circumferential rolling, in an optional timing of the ring rolling. Furthermore, in the starting stage of the ring rolling, the length of the heating element disposition space in the region immediately before inner and outer circumferential rolling may be already longer than half the length of the outer circumferential side induction heating element in the ring circumferential direction, preferably, in the ring tangential direction.

<Method for Manufacturing Ring-Rolled Product>

The method for manufacturing the ring-rolled product according to the present Specific Example includes ring rolling as follows. As shown in FIGS. 14 and 15, in the state in which the ring material 1 is rotated, the operation of pressing the ring material 1 in the ring axial direction by the pair of axial rolls 4 and 5, the operation of induction-heating the entire outer circumferential surface 1c of the ring material 1 by the outer circumferential side induction heating element 8 which moves as described later, and the operation of pressing the ring material 1 in the ring radial direction by the mandrel roll 2 and the main roll 3 are repeated in this order. At this time, the ring material 1 can be deformed such that the diameter thereof is enlarged by moving one or both of the mandrel roll 2 and the main roll 3 relatively in the ring radial direction with the center of the ring material 1 in the radial direction as the reference.

Movement of the outer circumferential side induction heating element 8 is performed as follows. In the period before the intermediate stage from the starting stage of ring rolling shown in FIG. 14, the center of the outer circumferential side induction heating element 8 is disposed outside the heating element disposition space in the region immediately before inner and outer circumferential rolling, in the ring circumferential direction, preferably, in the ring tangential direction. In particular, according to advancing the ring rolling to the intermediate stage from the starting stage, the center of the outer circumferential side induction heating element 8 may preferably move so as to be closer to the region immediately before inner and outer circumferential rolling. Next, in the period from the intermediate stage to the completing stage of the ring rolling, the center of the outer circumferential side induction heating element 8 is disposed in the region immediately before inner and outer circumferential rolling, in the ring circumferential direction, preferably, in the ring tangential direction. In particular, according to advancing the ring rolling from the intermediate stage to the completing stage, the center of the outer circumferential side induction heating element 8 may preferably move closer to the main roll 3.

In the ring rolling, the temperature of the ring material 1 which is induction-heated by the outer circumferential side induction heating element 8, may preferably be set within the range from approximately 850 degrees C. to approximately 1150 degrees C. However, the temperature is not limited to this, and it can be adjusted such that the temperature distribution of the ring material in the radial direction is efficiently controllable so as to be within the appropriate temperature range, and as an example, the temperature can be adjusted so as to make the temperature distribution of the ring material uniform in the radial direction.

Operations and Effects

The method for manufacturing the ring-rolled product according to the present Specific Example can provide the operations and the effects which are the same as the operations and the effects of the First Embodiment except for the effect based on that the outer circumferential side induction heating element 8 is located between the main roll 3 and the guide roll 6 on one side.

Furthermore, regarding the method for manufacturing the ring-rolled product according to the present Specific Example, after the intermediate stage of the ring rolling, the outer circumferential side induction heating element 8 moves such that the center of the outer circumferential side induction heating element 8 is disposed in the region immediately before inner and outer circumferential rolling, in the ring circumferential direction in the case of being seen from the axial direction of the ring material 1. Furthermore, before the intermediate stage of the ring rolling, the length S1 of the heating element disposition space in the region immediately before inner and outer circumferential rolling is half the length T of the outer circumferential side induction heating element or less, in the ring circumferential direction, preferably, in the ring tangential direction. After the intermediate stage of the ring rolling, the length S2 of the heating element disposition space in the region immediately before inner and outer circumferential rolling is larger than half the length T of the outer circumferential side induction heating element, in the ring circumferential direction, preferably, in the ring tangential direction, by enlargement of the diameter of the ring material 1. Consequently, even when it is difficult to dispose the outer circumferential side induction heating element 8 in the region immediately before inner and outer circumferential rolling at the starting stage of ring rolling, due to constraints such as layout of the rolling device, the shape and size of the ring material 1, and/or the like, the temperature distribution of the ring material 1 in the radial direction can be efficiently controlled within the appropriate temperature range in the inner and outer circumferential rolling region immediately after the ring material 1 passes through the region immediately before inner and outer circumferential rolling, after the intermediate stage of the ring rolling. As a result, the quality such as the dimensional accuracy of the ring-rolled product which is to be manufactured, can be efficiently enhanced.

Second Embodiment

A method for manufacturing a ring-rolled product according to a Second Embodiment of the present invention will be described hereinafter. Note that the method for manufacturing a ring-rolled product according to the present Embodiment may preferably be used in a case in which a protruded portion having an edge-shaped portion is formed on an outer circumferential side region of the ring material 1.

<Rolling Device>

Figure 5:
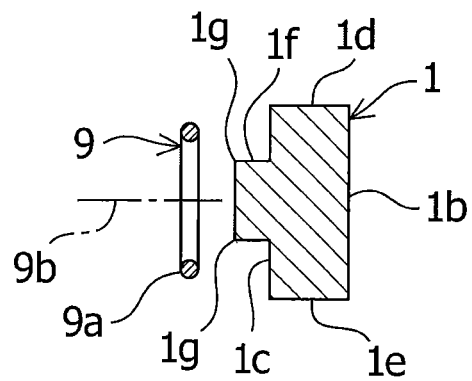
FIG. 5 is a diagram schematically showing a cross-section of a ring material and an induction heating coil in a Second Embodiment of the present invention, which is cut along a line corresponding to line A-A in FIG. 2.
Figure 6:
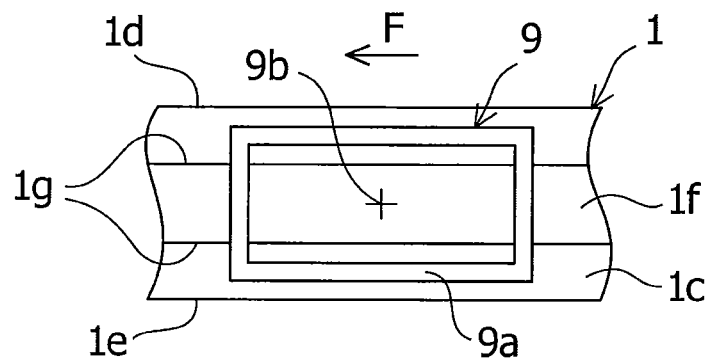
FIG. 6 is a front view schematically showing a part of the ring material and the induction heating coil in the Second Embodiment of the present invention.

As shown in FIGS. 5 and 6, a rolling device which is used in the present Embodiment, has an outer circumferential side induction heating element 9 which will be described hereinafter instead of the outer circumferential side induction heating element 8 of the First Embodiment. However, regarding the other configuration, the rolling device is the same as the rolling device which is used in the First Embodiment.

<Induction Heating Element>

As shown in FIGS. 5 and 6, the outer circumferential side induction heating element 9 of the present Embodiment is the same as the outer circumferential side induction heating element 8 of the First Embodiment except for the following feature. Regarding the feature different from the First Embodiment, in the outer circumferential side induction heating element 9, an induction heating coil 9a is disposed such that it is apart from the protruded portion 1f of the outer circumferential surface 1c of the ring material 1 in the ring radial direction, and a direction of a winding axis 9b of a winding wire is disposed so as to be directed to the protruded portion 1f. Furthermore, both end portions of the protruded portion 1f in the ring axial direction are disposed within a range sandwiched by both end portions of the induction heating coil 9a in the ring axial direction. In FIGS. 5 and 6, as an example, an end portion of the induction heating coil 9a in the ring axial direction is disposed between the edge-shaped portion 1g which is formed on the protruded portion 1f and an end portion of the outer circumferential surface 1c of the ring material 1 in the ring axial direction. The induction heating coil 9a can predominantly induction-heat the edge-shaped portion 1g of the ring material 1 in the region immediately before inner and outer circumferential rolling.

However, the present invention is not limited to this, and the rolling device may have a plurality of outer circumferential side induction heating elements to facilitate the temperature control of the ring material more. Furthermore, when the outer circumferential side region of the ring material has at least one of: one or more protruded portions; and one or more recessed portions, the edge-shaped portion which is formed on the outer circumferential side region of the ring material, can be configured so as to be induction-heated predominantly in the region immediately before inner and outer circumferential rolling. Furthermore, if the edge-shaped portion of the ring material can be induction-heated, the direction of the winding axis of the induction heating coil may be directed to other spots than the protruded portion of the outer circumferential surface of the ring material. If the edge-shaped portion of the ring material can be induction-heated, the outer circumferential side induction heating element may have a magnetic core on which the induction heating coil is wound, and in this case, the edge-shaped portion of the ring material is induction-heated on the line of the magnetic flux which is generated from the magnetic core.

In FIG. 6, an outer-peripheral edge portion of the induction heating coil 9a is formed into a substantially quadrangular shape when seen from the direction of the winding axis 9b. However, the outer-peripheral edge portion of the induction heating coil is not limited to this, and it can be formed into a substantially circular shape, a substantially elliptical shape, a substantially polygonal shape other than the substantially quadrangular shape, and/or the like when seen from the direction of the winding axis. Furthermore, the number of turns of the induction heating coil 9a may preferably be more than one as necessary the density of the line of the magnetic force in the range which enables manufacturing of the coil.

<Method for Manufacturing Ring-Rolled Product>

The method for manufacturing the ring-rolled product according to the present Embodiment includes ring rolling as follows by this rolling device. In the ring rolling, the mandrel roll 2 and the main roll 3, and the pair of axial rolls 4 and 5 rotate. In connection with rotating these rolls, the ring material 1 heated in advance, rotates to one side (shown by the arrow F in FIG. 6) in the ring circumferential direction around the axis 1a, as in the First Embodiment. Furthermore, in a state in which the ring material 1 rotates, an operation of pressing the ring material 1 in the ring axial direction by the pair of axial rolls 4 and 5, an operation of induction-heating the edge-shaped portion 1g of the ring material 1 by the outer circumferential side induction heating element 9 which is disposed on the outer circumferential side of the ring material 1 in the region immediately before inner and outer circumferential rolling, and an operation of pressing the ring material 1 in the ring radial direction by the mandrel roll 2 and the main roll 3 are repeated in this order. At this time, one or both of the mandrel roll 2 and the main roll 3 is or are relatively moved in the ring radial direction with the center of the ring material 1 in the radial direction as a reference so that the ring material 1 can be deformed to enlarge the diameter thereof.

In the ring rolling, the temperature of the ring material 1 which is induction-heated by the outer circumferential side induction heating element 9, may preferably be set in the range from approximately 850 degrees C. to approximately 1150 degrees C. However, the temperature is not limited to this, and it can be adjusted such that a temperature distribution of the ring material in the radial direction can be controlled efficiently within an appropriate temperature range, and as an example, it can be adjusted to make the temperature distribution of the ring material uniform in the radial direction.

Operations and Effects

Regarding the method for manufacturing the ring-rolled product according to the present Embodiment, the edge-shaped portion 1g of the outer circumferential side region of the ring material 1 in which the temperature is particularly reduced easily, is directly induction-heated in the region immediately before inner and outer circumferential rolling. As a result, the temperature distribution of the ring material in the radial direction 1 can be efficiently controlled so as to be within the appropriate temperature range in the inner and outer circumferential rolling region. Furthermore, the present Embodiment can provide the operations and effects which are the same as the operations and the effects in the First Embodiment except for the above operation and effect obtained instead of those based on induction-heating the entire outer circumferential surface 1c of the ring material 1.

Specific Example of Second Embodiment

As a Specific Example of the Second Embodiment of the present invention, the configuration of the outer circumferential side induction heating element 8 which is described in the Specific Example of the First Embodiment, can be applied to the configuration of the outer circumferential side induction heating element 9 of the Second Embodiment. Furthermore, the method for manufacturing the ring-rolled product using the outer circumferential side induction heating element 9, is the same as the method for manufacturing the ring-rolled product according to the Specific Example of the First Embodiment, except for the feature of induction-heating the edge-shaped portion 1g of the ring material 1 instead of induction-heating the entire outer circumferential surface 1c of the ring material 1. Furthermore, the method for manufacturing the ring-rolled product according to the present Specific Example can provide the operations and effects which are the same as those in the Specific Example of the First Embodiment except for the operation and effect based on performing induction heating of the edge-shaped portion 1g of the ring material 1, obtained instead of the operation and effect based on performing induction heating of the entire outer circumferential surface 1c of the ring material 1.

Third Embodiment

A method for manufacturing a ring-rolled product according to a Third Embodiment of the present invention will be described hereinafter.

<Rolling Device>

Figure 7:
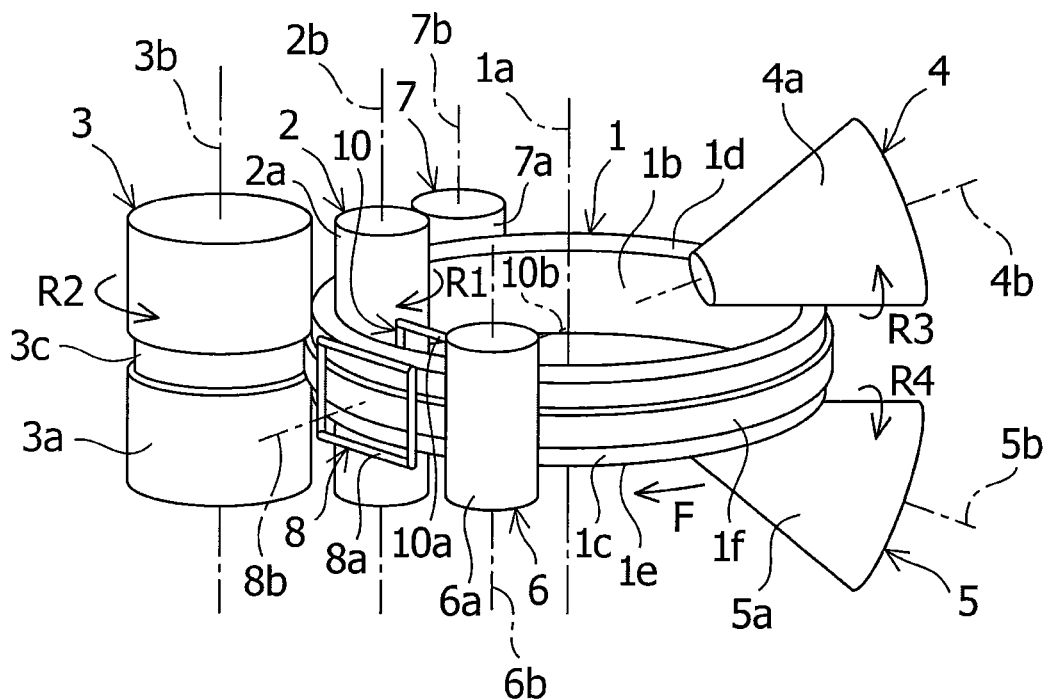
FIG. 7 is a perspective view schematically showing a rolling device which is used in a Third Embodiment of the present invention.
Figure 8:
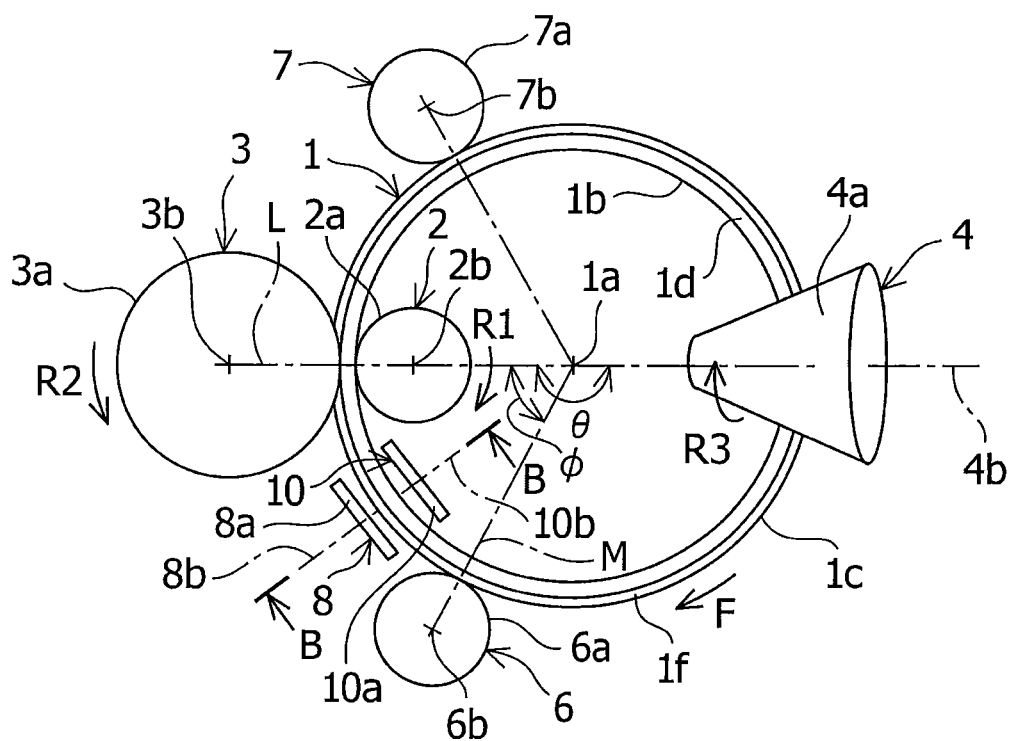
FIG. 8 is a plan view schematically showing the rolling device which is used in the Third Embodiment of the present invention.
Figure 9:
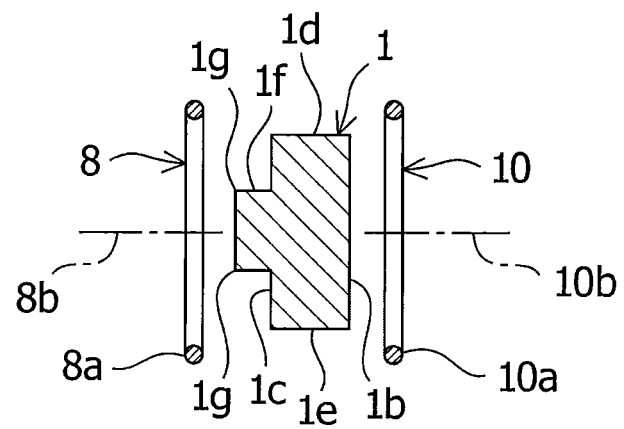
FIG. 9 is a view schematically showing a cross-section of a ring material and an induction heating coil in the Third Embodiment of the present invention, which is cut along line B-B in FIG. 8.

The rolling device which is used in the present Embodiment has a configuration in which an inner circumferential side induction heating element is further provided in the rolling device used in the First or the Second Embodiment. Hereinafter, a case in which an inner circumferential side induction heating element 10 is provided in the rolling device which is used in the First Embodiment as shown in FIGS. 7 to 9 will be described. However, the inner circumferential side induction heating element can be provided in the rolling device which is used in the Second Embodiment.

<Inner Circumferential Side Induction Heating Element>

As shown in FIGS. 7 to 9, the inner circumferential side induction heating element 10, an induction heating coil 10a thereof and a winding axis 10b thereof are the same as the outer circumferential side induction heating element 8, the induction heating coil 8a and the winding axis 8b of the First Embodiment except for the following feature. Regarding a different feature from the First Embodiment, the inner circumferential side induction heating element 10 is disposed on an inner circumferential side of the ring material 1 in the region immediately before inner and outer circumferential rolling.

The rolling device may include means for directly induction-heating the ring material 1 except for the outer circumferential side induction heating element 8 and the inner circumferential side induction heating element 10. However, in particular, when considering that it is difficult for the temperature of the ring material 1 to control in the region immediately after the ring material 1 passes through the pair of axial rolls 4 and 5, only the outer circumferential side induction heating element 8 and the inner circumferential side induction heating element 10 may preferably be disposed in the region immediately before inner and outer circumferential rolling. The outer circumferential side induction heating element 8 and the inner circumferential side induction heating element 10 may more preferably be disposed so as to face each other in the ring radial direction with a cross-section of the ring material 1 sandwiched between them. Furthermore, the means for directly induction-heating the ring material 1 may be only the outer circumferential side induction heating element 8 and the inner circumferential side induction heating element 10.

This inner circumferential side induction heating element 10 is configured so as to induction-heat the entire inner circumferential surface 1b of the ring material 1. Furthermore, the temperature of the outer circumferential side region of the ring material 1 which is induction-heated by the outer circumferential side induction heating element 8, is set to be higher than a temperature of an inner circumferential side region of the ring material 1 which is induction-heated by the inner circumferential side induction heating element 10.

However, the present invention is not limited to this, and the rolling device may have a plurality of inner circumferential side induction heating elements to facilitate the temperature control of the ring material more. Furthermore, the inner circumferential side induction heating element, the inner circumferential side induction heating coil thereof, and the winding axis thereof may be configured so as to be the same as the outer circumferential side induction heating element 9, the induction heating coil 9a and the winding axis 9b in the Second Embodiment, except for the aforementioned features.

<Method for Manufacturing Ring-Rolled Product>

The method for manufacturing the ring-rolled product according to the present Embodiment includes ring rolling as follows by this rolling device. As shown in FIGS. 7 and 8, in the ring rolling, the mandrel roll 2 and the main roll 3, and the pair of axial rolls 4 and 5 rotate. In connection with rotating these rolls, the ring material 1 which is heated in advance, rotates to one side (shown by the arrow F) in the ring circumferential direction around the axis 1a, as in the First Embodiment. Furthermore, in a state in which the ring material 1 rotates, an operation of pressing the ring material 1 in the ring axial direction by the pair of axial rolls 4 and 5, an operation of induction-heating the entire inner and outer circumferential surfaces 1b and 1c of the ring material 1 by the outer circumferential side induction heating element 8 and the inner circumferential side induction heating element 10 which are respectively disposed on the inner and outer circumferential sides of the ring material 1 in the region immediately before inner and outer circumferential rolling, and an operation of pressing the ring material 1 in the ring radial direction by the mandrel roll 2 and the main roll 3 are repeated in this order. At this time, one or both of the mandrel roll 2 and the main roll 3 is or are relatively moved in the ring radial direction with the center of the ring material 1 in the radial direction as a reference so that the ring material 1 can be deformed to enlarge the diameter thereof.

In the ring rolling, the temperature of the outer circumferential side region of the ring material 1 which is induction-heated by the outer circumferential side induction heating element 8, is set to be higher than the temperature of the inner circumferential side region of the ring material 1 which is induction-heated by the inner circumferential side induction heating element 10. The temperatures of the outer circumferential side region and the inner circumferential side region of the ring material 1 which are induction-heated respectively by the outer circumferential side induction heating element 8 and the inner circumferential side induction heating element 10 may preferably be set within the range from approximately 850 degrees C. to approximately 1150 degrees C. However, these temperatures are not limited to this, and they can be adjusted such that the temperature distribution of the ring material in the radial direction can be controlled efficiently within the appropriate temperature range, and as an example, they can be adjusted such that the temperature distribution of the ring material in the radial direction is uniform.

Operations and Effects

Regarding the method for manufacturing the ring-rolled product according to the present Embodiment, in the region immediately before inner and outer circumferential rolling, the outer circumferential side and the inner circumferential side portions of the ring material 1 are induction-heated such that the temperature to induction-heat the outer circumferential side region of the ring material 1 of which temperature is easily lowered, is higher than the temperature to induction-heat the inner circumferential side region of the ring material 1. Therefore, the temperature distribution of the ring material 1 in the radial direction can be efficiently controlled so as to be within the appropriate temperature range in the inner and outer circumferential rolling region immediately after the ring material 1 passes through the region immediately before inner and outer circumferential rolling. As a result, the quality such as the dimensional accuracy of the ring-rolled product which is to be manufactured, can be efficiently enhanced.

First Specific Example of Third Embodiment

As a First Specific Example of the Third Embodiment of the present invention, the rolling device can also have the outer circumferential side induction heating element 8 of the Specific Example of the First Embodiment instead of the outer circumferential side induction heating element 8 of the Third Embodiment. In the present Specific Example, the inner circumferential side induction heating element 10 may move so as to follow movement of the outer circumferential side induction heating element 8 in the ring circumferential direction. The method for manufacturing the ring-rolled product according to the present Specific Example is a method in which the outer circumferential side induction heating element 8 is operated in the same manner as the Specific Example of the First Embodiment, in the method for manufacturing the ring-rolled product according to the Third Embodiment. Furthermore, regarding the method for manufacturing the ring-rolled product according to the present Specific Example, the operations and the effects described in the Third Embodiment can be obtained in addition to the operations and the effects in the Specific Example of the First Embodiment.

Second Specific Example of Third Embodiment

As a Second Specific Example of the Third Embodiment of the present invention, the rolling device can also have the outer circumferential side induction heating element 9 of the Specific Example of the Second Embodiment instead of the outer circumferential side induction heating element 8 of the Third Embodiment. Note that in the present Specific Example, the inner circumferential side induction heating element 10 may move so as to follow movement of the outer circumferential side induction heating element 9 in the ring circumferential direction. The method for manufacturing the ring-rolled product according to the present Specific Example is the method in which the outer circumferential side induction heating element 9 is operated in the same manner as the Specific Example of the Second Embodiment, in the method for manufacturing the ring-rolled product according to the Third Embodiment. Furthermore, regarding the method for manufacturing the ring-rolled product according to the present Specific Example, the operations and the effects described in the Third Embodiment can be obtained in addition to the operations and the effects in the Specific Example of the Second Embodiment.

Fourth Embodiment

Figure 10:
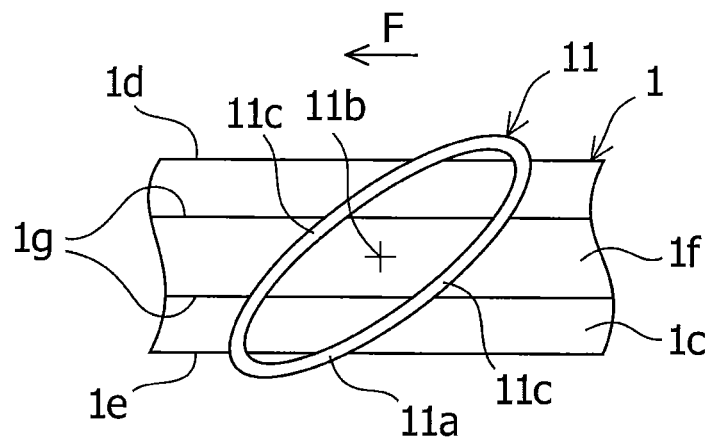
FIG. 10 is a front view schematically showing a part of a ring material and an induction heating coil in a Fourth Embodiment of the present invention.

A method for manufacturing a ring-rolled product according to a Fourth Embodiment of the present invention will be described hereinafter.
<Rolling Device>
As shown in FIG. 10, a rolling device which is used in the present Embodiment, has an induction heating element 11 which will be described hereinafter, instead of the outer circumferential side induction heating element 8 of the First or the Third Embodiment. However, regarding the other configuration, the rolling device is the same as the rolling device which is used in the First or the Third Embodiment.
<Induction Heating Element>
As shown in FIG. 10, the induction heating element 11 of the present Embodiment, an induction heating coil 11a thereof, and a winding axis 1b thereof are the same as the outer circumferential side induction heating element 8 of the First Embodiment, the induction heating coil 8a thereof, and the winding axis 8b thereof, except for the following features. Regarding the feature different from the First Embodiment, an outer-peripheral edge portion of the induction heating coil 11a is formed into a substantially elliptical shape when seen from a direction of the winding axis 11b, and it is oriented in such a manner that a long axis thereof is inclined in the ring circumferential direction relative to the axis 1a of the ring material 1. Both edge portions of the outer-peripheral edge portion of the induction heating coil 11a in the ring circumferential direction have inclined portions 11c which are disposed along directions so as to incline in the ring circumferential direction relative to the axis 1a of the ring material 1, between both end portions of the outer circumferential surface 1c of the ring material 1 in the ring axial direction.

To efficiently control the temperature distribution of the ring material 1 in the appropriate temperature range, the inclination of the inclined portion 11c relative to the axis 1a of the ring material 1 can be set so as to correspond to at least one of the feeding speeds of the ring material 1, a kind of the metal material which is used in the ring material 1, the shape of the ring material 1, the distance between the ring material 1 and the induction heating coil 11a, the temperature at which the ring material 1 is heated in advance before ring rolling, the temperature at which the ring material 1 is induction-heated, and the like. Furthermore, the number of turns of the induction heating coil 11a may preferably be more than one as necessary for the density of the line of the magnetic force in the range which enables manufacturing of the coil.

However, the induction heating coil is not limited to this, and the outer-peripheral edge portion of the induction heating coil can have at least one inclined portion. In this case, the outer-peripheral edge portion of the induction heating coil can be formed into a substantially polygonal shape including the inclined portion when seen from the direction of the winding axis.

Figure 11:
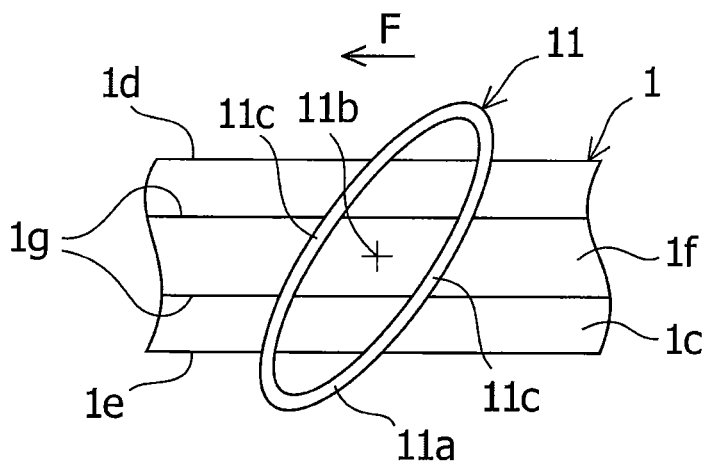
FIG. 11 is a front view schematically showing a part of the ring material and the induction heating coil in FIG. 10 in a state in which the inclinations of inclined portions of the induction heating coil are changed.

Furthermore, as shown in FIGS. 10 and 11, the induction heating coil 11a may be configured such that the inclination of the inclined portion 11c relative to the axis 1a of the ring material 1 is adjustable. For example, the induction heating coil 11a can be configured so as to be rotatable around the winding axis 11b or other axes along the ring radial direction, by a rotation mechanism (not shown). Note that FIG. 11 shows a state in which the inclination of the inclined portion 11c relative to the axis 1a of the ring material 1 is made smaller than the inclination of the inclined portion 11c shown in FIG. 10, by rotation of the induction heating coil 11a around the winding axis 1b.

This induction heating element 11 may preferably be disposed in the same manner as the outer circumferential side induction heating element 8 of the First Embodiment, according to the viewpoint of obtaining the operations and the effects which are the same as the operations and the effects of the First Embodiment. However, the induction heating element 11 can be disposed on the outer circumferential side of the region immediately before inner and outer circumferential rolling, and furthermore, it can be disposed on the outer circumferential side of the ring material 1 in the other regions than the outer circumferential side of the region immediately before inner and outer circumferential rolling.

If the rolling device which is used in the present Embodiment, is the same as the rolling device which is used in the Third Embodiment, except for the aforementioned induction heating element 11, the induction heating element which corresponds to the inner circumferential side induction heating element 10, can be configured in the same manner as the induction heating element 11, except for a feature that the inner circumferential side of the ring material 1 is induction-heated.

<Method for Manufacturing Ring-Rolled Product>

The method for manufacturing the ring-rolled product according to the present Embodiment includes ring rolling as follows by this rolling device. In the ring rolling, the mandrel roll 2 and the main roll 3, and the pair of axial rolls 4 and 5 rotate. In connection with rotating these rolls, the ring material 1 which is heated in advance, rotates to one side (shown by the arrow F in FIGS. 10 and 11) in the ring circumferential direction around the axis 1a, as in the First or the Third Embodiment. Furthermore, in a state in which the ring material 1 rotates, an operation of pressing the ring material 1 in the ring axial direction by the pair of axial rolls 4 and 5, an operation of induction-heating at least the outer circumferential surface 1c of the ring material 1 or the outer circumferential side region by the induction heating coil 11a of the induction heating element 11 which is disposed on the outer circumferential side of the ring material 1 in the region immediately before inner and outer circumferential rolling, and an operation of pressing the ring material 1 in the ring radial direction by the mandrel roll 2 and the main roll 3 are repeated in this order. At this time, one or both of the mandrel roll 2 and the main roll 3 is or are relatively moved in the ring radial direction with the center of the ring material 1 in the radial direction as a reference so that the ring material 1 can be deformed to enlarge the diameter thereof.

In the ring rolling, the temperature of the ring material 1 which is induction-heated by the induction heating element 11, may preferably be set within the range from approximately 850 degrees C. to approximately 1150 degrees C. However, the temperature is not limited to this, and it can be adjusted so as to control the temperature distribution of the ring material in the radial direction efficiently within the appropriate temperature range, and as an example, the temperature can be adjusted so as to make the temperature distribution of the ring material uniform in the radial direction.

Furthermore, as shown in FIGS. 10 and 11, during the ring rolling or before the ring rolling, the inclination of the inclined portion 11c of the induction heating coil 11a relative to the axis 1a of the ring material 1 can be changed by the rotation mechanism according to the feeding speed of the ring material 1. In particular, when the inclination of the inclined portion 1c relative to the axis 1a of the ring material 1 is adjusted such that the time needed for the ring material 1 to pass under the magnetic line of the force of the induction heating coil 11a, is changed according to the various portions of the surface of the ring material 1, the temperature of the ring material 1 which is induction-heated by the induction heating element 11, can be controlled so as to be within the appropriate rolling temperature range. For example, to make the temperature distribution of the ring material more uniform, it may be preferable that a longitudinal direction of the inclined portion 11c relative to the axis 1a of the ring material 1 be adjusted so as to be close to the ring circumferential direction when the feeding speed of the ring material 1 is increased, and be adjusted so as to be close to the ring axial direction when the feeding speed of the ring material 1 is decreased. To control the temperature distribution of the ring material within the appropriate temperature range efficiently, it is possible to adjust the inclination of the inclined portion relative to the axis of the ring material in response to at least one of the feeding speeds of the ring material, the kind of the metal material which is used in the ring material, the shape of the ring material, the distance between the ring material and the induction heating coil, the temperature at which the ring material is heated in advance, the temperature at which the ring material is induction-heated, and the like, by the rotation mechanism.

Operations and Effects

Regarding the method for manufacturing the ring-rolled product according to the present Embodiment, the outer-peripheral edge portion of the induction heating coil 11a has the inclined portion 11c disposed along the direction which is inclined relative to the circumferential direction or the axial direction of the ring material 1, so that the range of the magnetic field in the induction heating coil 11a can be changed along the axial direction so as to control the temperature distribution of the outer circumferential surface 1c of the ring material 1 in the axial direction within the appropriate temperature range efficiently. As a result, the quality such as the dimensional accuracy of the ring-rolled product which is to be manufactured can be efficiently enhanced.

Regarding the method for manufacturing the ring-rolled product according to the present Embodiment, the outer-peripheral edge portion of the induction heating coil 11a is inclined relative to the circumferential direction or the axial direction of the ring material 1 by using the rotation mechanism which is configured so as to make the inclination of the induction heating coil 11a relative to the circumferential direction or the axial direction of the ring material 1 changeable, so that the range of the magnetic field in the induction heating coil 11a can be changed along the axial direction so as to efficiently control the temperature distribution of the outer circumferential surface 1c of the ring material 1 in the axial direction, within the more appropriate temperature range. As a result, the quality such as the dimensional accuracy of the ring-rolled product which is to be manufactured, can be enhanced more efficiently.

Modified Example of Fourth Embodiment

Figure 12:
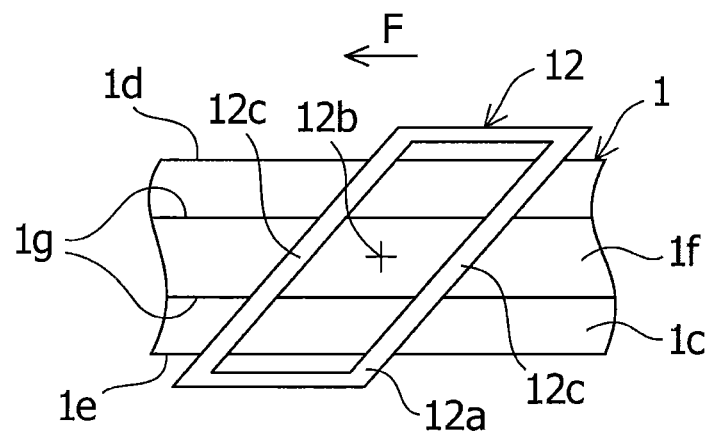
FIG. 12 is a front view schematically showing a part of a ring material and an induction heating coil in a Modified Example of the Fourth Embodiment of the present invention.

As a Modified Example of the Fourth Embodiment, as shown in FIG. 12, an outer-peripheral edge portion of an induction heating coil 12a of an induction heating element 12 can be formed into a substantially parallelogram. Inclined portions 12c which are inclined to the other side in the ring circumferential direction relative to the axis 1a of the ring material 1 and are disposed between both end portions of the outer circumferential surface 1c of the ring material 1 in the ring axial direction, are respectively provided at both of respective edge portions of the induction heating coil 12a in the ring circumferential direction. The winding axis 12b of the induction heating coil 12a is oriented in the same manner as the winding axis 11b of the induction heating coil 11a in the Fourth Embodiment.

Fifth Embodiment

A method for manufacturing a ring-rolled product according to a Fifth Embodiment of the present invention will be described hereinafter.
<Rolling Device>

Figure 13:
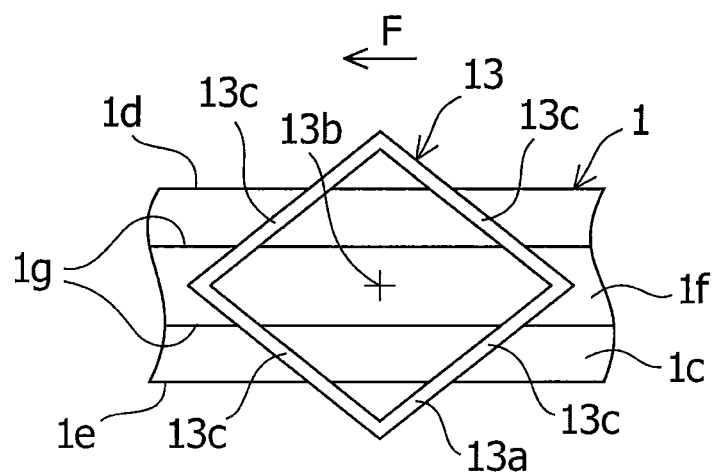
FIG. 13 is a front view schematically showing a part of a ring material and an induction heating coil portion in a Fifth Embodiment of the present invention.

As shown in FIG. 13, a rolling device which is used in the present Embodiment, has an induction heating element 13 which will be described hereinafter instead of the outer circumferential side induction heating element 8 of the First or the Third Embodiment. However, regarding the other configuration, the rolling device is the same as the rolling device which is used in the First or the Third Embodiment.
<Induction Heating Element>

As shown in FIG. 13, the induction heating element 13 of the present Embodiment, an induction heating coil 13a thereof, and a winding axis 13b thereof are the same as the outer circumferential side induction heating element 8 of the First Embodiment, the induction heating coil 8a thereof, and the winding axis 8b thereof, except for the following features. Regarding the feature different from the First embodiment, an outer-peripheral edge portion of the induction heating coil 13a is formed into a substantially rhombic shape when seen from a direction of the winding axis 13b. Both of respective edge portions of the outer-peripheral edge portion of the induction heating coil 13a in the ring circumferential direction have two inclined portions 13c which incline to a center side of the induction heating coil 13a in the ring circumferential direction relative to the axis 1a of the ring material 1, from a substantially central portion of the outer circumferential surface 1c of the ring material 1 in the ring axial direction to both end portions those in the ring axial direction.

To efficiently control the temperature distribution of the ring material 1 within the appropriate temperature range, the inclination of the inclined portion 13c relative to the axis 1a of the ring material 1 can be set in response to at least one of the feeding speeds of the ring material 1, the kind of the metal material which is used in the ring material 1, the shape of the ring material 1, the distance between the ring material 1 and the induction heating coil 13a, the temperature at which the ring material 1 is heated in advance before ring rolling, the temperature at which the ring material 1 is induction-heated, and the like. Furthermore, the number of turns of the induction heating coil 13a may preferably be set at more than one as necessary the density of the line of the magnetic force in the range which enables manufacturing of the coil.

However, the induction heating coil is not limited to this, and at least only one of the edge portions of the outer-peripheral edge portion of the induction heating coil in the ring circumferential direction may have two inclined portions. In this case, the outer-peripheral edge portion of the induction heating coil can be formed into a substantially polygonal shape including these inclined portions, when seen from the direction of the winding axis.

Furthermore, the induction heating coil 13a may be configured such that the inclination of the inclined portion 13c relative to the axis 1a of the ring material 1 is adjustable. For example, the induction heating coil 13a can be configured so as to be rotatable around the winding axis 13b or other axes along the ring radial direction by a rotation mechanism (not shown).

This induction heating element 13 may preferably be disposed in the same manner as the outer circumferential side induction heating element 8 of the First Embodiment, according to the viewpoint of obtaining the operations and the effects the same as the operations and the effects in the First Embodiment. However, the induction heating element 13 can be disposed on the outer circumferential side of the region immediately before inner and outer circumferential rolling, and furthermore, it can be disposed on the outer circumferential side of the ring material 1 in the other regions.

When the rolling device which is used in the present Embodiment is the same as the rolling device which is used in the Third Embodiment, except for the aforementioned induction heating element 13, the induction heating element which corresponds to the inner circumferential side induction heating element 10, can be configured so as to be the same as the induction heating element 13 which is described so far, except for that the inner circumferential side of the ring material 1 is induction-heated.
<Method for Manufacturing Ring-Rolled Product>

The method for manufacturing the ring-rolled product according to the present Embodiment includes ring rolling as follows by this rolling device. In the ring rolling, the mandrel roll 2 and the main roll 3, and the pair of axial rolls 4 and 5 rotate. In connection with rotating these rolls, the ring material 1 which is heated in advance, rotates to one side (shown by the arrow F in FIG. 13) in the ring circumferential direction around the axis 1a, as in the First or the Third Embodiment. Furthermore, in a state in which the ring material 1 rotates, an operation of pressing the ring material 1 in the ring axial direction by the pair of axial rolls 4 and 5, an operation of induction-heating at least the outer circumferential surface 1c of the ring material 1 or the outer circumferential side region by the induction heating coil 13a of the induction heating element 13 which is disposed on the outer circumferential side of the ring material 1 in the region immediately before inner and outer circumferential rolling, and an operation of pressing the ring material 1 in the ring radial direction by the mandrel roll 2 and the main roll 3 are repeated in this order. At this time, one or both of the mandrel roll 2 and the main roll 3 is or are relatively moved in the ring radial direction with the center of the ring material 1 in the radial direction as a reference so that the ring material 1 can be deformed to enlarge the diameter thereof.

In the ring rolling, the temperature of the ring material 1 which is induction-heated by the induction heating element 13, may preferably be set in the range from approximately 850 degrees C. to approximately 1150 degrees C. However, the temperature is not limited to this, and it can be adjusted so as to control the temperature distribution of the ring material in the radial direction efficiently within the appropriate temperature range, and as an example, the temperature can be adjusted so as to make the temperature distribution of the ring material uniform in the radial direction.

Furthermore, in the ring rolling or before the ring rolling, the inclination of the inclined portion 13c of the induction heating coil 13a relative to the axis 1a of the ring material 1 can be changed by the rotary mechanism according to the feeding speed of the ring material 1. In particular, when the inclination of the inclined portion 13c relative to the axis 1a of the ring material 1 is adjusted such that the time needed for the ring material 1 to pass under the magnetic line of the force of the induction heating coil 13a, is changed according to the various portions of the surface of the ring material 1, the temperature of the ring material 1 which is induction-heated by the induction heating element 13, can be controlled to be within the appropriate rolling temperature range. To control the temperature distribution of the ring material within the appropriate temperature range efficiently, in the ring rolling or before the ring rolling, it may be preferable to adjust the inclination of the inclined portion 13c relative to the axis 1a of the ring material 1 in response to at least one of the feeding speeds of the ring material 1, the kind of the metal material which is used in the ring material 1, the shape of the ring material 1, the distance between the ring material 1 and the induction heating coil 13a, the temperature at which the ring material 11 is heated in advance, the temperature at which the ring material 1 is induction-heated, and the like, by the rotation mechanism.

Operations and Effects

Regarding the method for manufacturing the ring-rolled product according to the present Embodiment, the outer-peripheral edge portion of the induction heating coil 13a has the two inclined portions 13c disposed along the direction which is inclined relative to the circumferential direction or the axial direction of the ring material 1, so that the range of the magnetic field in the induction heating coil 13a can be changed along the axial direction so as to control the temperature distribution of the outer circumferential surface 1c of the ring material 1 in the axial direction within the appropriate temperature range efficiently. As a result, the quality such as the dimensional accuracy of the ring-rolled product which is to be manufactured, can be efficiently enhanced.

Regarding the method for manufacturing the ring-rolled product according to the present Embodiment, the outer-peripheral edge portion of the induction heating coil 13a is inclined relative to the circumferential direction or the axial direction of the ring material 1 by using the rotation mechanism which is configured so as to make the inclination of the induction heating coil 13a relative to the circumferential direction or the axial direction of the ring material 1 changeable, so that the range of the magnetic field in the induction heating coil 13a can be changed along the axial direction so as to efficiently control the temperature distribution of the outer circumferential surface 1c of the ring material 1 in the axial direction within the more appropriate temperature range. As a result, the quality such as the dimensional accuracy of the ring-rolled product which is to be manufactured, can be enhanced more efficiently.

Although the Embodiments of the present invention are described above, the present invention is not limited to the aforementioned Embodiments. The present invention can be deformed and changed based on the technical idea.

REFERENCE SIGNS LIST

1 Ring material
1a Axis
1b Inner circumferential surface
1c Outer circumferential surface
1d, 1e End surface in axial direction
1g Edge-shaped portion
2 Mandrel roll
3 Main roll
3a Circumferential surface
4, 5 Axial roll
6, 7 Guide roll
8, 9 Outer circumferential side induction heating element
8a, 9a Induction heating coil
8b, 9b Winding axis
10 Inner circumferential side induction heating element
11, 12, 13 Induction heating element
11a, 12a, 13a Induction heating coil
11b, 12b, 13b Winding axis
11c, 12c, 13c Inclined portion
θ, φ Angle
F, B, R1, R2, R3, R4 Arrow
L Reference line segment
M Boundary line segment
S1, S2, T Length

The invention claimed is:

1. A method for manufacturing a ring-rolled product, the method forming the ring-rolled product from a ring material by using a rolling device, the rolling device including a mandrel roll, a main roll, a guide roll, and at least one induction heating element, the mandrel roll and the main roll being rotatable, the mandrel roll and the main roll being configured so as to respectively contact inner and outer circumferential surfaces of the ring material in a state in which the ring material is rotated in a circumferential direction thereof, the mandrel roll and the main roll being configured so as to press the ring material in a radial direction thereof, the at least one induction heating element being configured so as to induction-heat the ring material, wherein the guide roll is rotatably disposed on an outer circumferential side of the ring material within a region immediately before inner and outer circumferential rolling, which is sandwiched by a reference line segment and a boundary line segment in the circumferential direction of the ring material, the reference line segment connecting a rotation axis of the ring material and a rotation axis of the main roll in the radial direction of the ring material, the boundary line segment being disposed so as to be rotated around the rotation axis of the ring material from the reference line segment toward a direction opposite of a rotation direction of the ring material, by an angle of 90 degrees or less, and the guide roll is configured so as to be contactable to the ring material, the at least one induction heating element includes an outer circumferential side induction heating element which is disposed on an outer circumferential side of the ring material so as to induction-heat an outer circumferential side region of the ring material, and which is configured to be movable, the method comprises a step of carrying out ring rolling having an operation of rolling the ring material by using the rolling device, in this step, a diameter of the ring material being enlarged in the ring rolling, and the ring material being induction-heated by the at least one induction heating element in the ring rolling, wherein the outer circumferential side induction heating element moves such that when seen from an axial direction of the ring material, before an intermediate stage of the ring rolling, in the circumferential direction of the ring material, a length of a heating element disposition space which is located on an outer circumferential side of the ring material within the region immediately before inner and outer circumferential rolling and is located between the guide roll and the boundary line segment within this region, is half a length of the outer circumferential side induction heating element or less, and a center of the outer circumferential side induction heating element in a direction which corresponds to a circumferential direction of the outer circumferential side region of the ring material, is located outside the region immediately before inner and outer circumferential rolling, and after the intermediate stage in the ring rolling, a diameter of the ring material is enlarged so that in the circumferential direction of the ring material, the length of the heating element disposition space in the region immediately before inner and outer circumferential rolling is larger than half the length of the outer circumferential side induction heating element, and the center of the outer circumferential side induction heating element is disposed within the region immediately before inner and outer circumferential rolling in the circumferential direction of the ring material, and the outer circumferential side induction heating element induction-heats the ring material.

2. The method for manufacturing a ring-rolled product according to claim 1, wherein
the rolling device further includes a pair of axial rolls, the axial rolls being rotatable, the axial rolls being configured so as to respectively contact both end surfaces in the axial direction of the ring material, the axial rolls being configured so as to press the ring material in the axial direction of the ring material in the state in which the ring material is rotated in the circumferential direction thereof, the axial rolls being disposed so as to be apart from the main roll in the circumferential direction of the ring material, and
a space in the circumferential direction of the ring material between the outer circumferential side induction heating element and the main roll is set to be smaller than the space in the circumferential direction of the ring material between the outer circumferential side induction heating element and the pair of axial rolls.

3. The method for manufacturing a ring-rolled product according to claim 1, wherein
the rolling device further comprises a pair of axial rolls, the axial rolls being rotatable, the axial rolls being configured so as to respectively contact both end surfaces of the ring material in the axial direction, the axial rolls being configured so as to press the ring material in the axial direction of the ring material in the state in which the ring material is rotated in the circumferential direction, the axial rolls being disposed so as to be apart from the main roll in the circumferential direction of the ring material,
the rolling device further includes a guide roll, the guide roll being rotatable, the guide roll being disposed within a range which reaches the main roll from the pair of axial rolls toward a rotation direction side of the ring material, on the outer circumferential side of the ring material, the guide roll being configured so as to be contactable to the ring material, and
the outer circumferential side induction heating element is located between the main roll and the guide roll.

4. The method for manufacturing a ring-rolled product according to claim 1, wherein the outer circumferential side induction heating element includes an induction heating coil having a winding wire which is wound in a circulating manner, and
both end portions of an outer circumferential surface of the ring material in the axial direction of the ring material are disposed within a range in which these end portions are sandwiched by both end portions of the induction heating coil in the axial direction of the ring material.

5. The method for manufacturing a ring-rolled product according to claim 1, wherein
the ring material has a protruded portion formed on an outer circumferential side region thereof, the protruded portion extending in the circumferential direction of the ring material,
the outer circumferential side induction heating element includes an induction heating coil having a winding wire which is wound in a circulating manner, and
both end portions of the protruded portion in the axial direction of the ring material are disposed within a range in which these end portions are sandwiched by both end portions of the induction heating coil in the axial direction of the ring material.

6. A method for manufacturing a ring-rolled product, the method forming the ring-rolled product from a ring material by using a rolling device, the rolling device including a mandrel roll, a main roll, and at least one induction heating element, the mandrel roll and the main roll being rotatable, the mandrel roll and the main roll being configured so as to respectively contact inner and outer circumferential surfaces of the ring material in a state in which the ring material is rotated in a circumferential direction thereof, the mandrel roll and the main roll being configured so as to press the ring material in a radial direction thereof, the at least one induction heating element being configured so as to induction-heat the ring material, wherein
the at least one induction heating element includes an outer circumferential side induction heating element which is disposed on an outer circumferential side of the ring material so as to induction-heat an outer circumferential side region of the ring material, and
when seen from an axial direction of the ring material, a center of the outer circumferential side induction heating element in a direction which corresponds to a circumferential direction of the outer circumferential side region of the ring material, is disposed within a region immediately before inner and outer circumferential rolling, which is sandwiched by a reference line segment and a boundary line segment in the circumferential direction of the ring material, the reference line segment connecting a rotation axis of the ring material and a rotation axis of the main roll in the radial direction of the ring material, the boundary line segment being disposed so as to be rotated around the rotation axis of the ring material from the reference line segment toward a direction opposite of a rotation direction of the ring material, by an angle of 90 degrees or less,
wherein
the at least one induction heating element further includes an inner circumferential side induction heating element which is disposed on an inner circumferential side of the ring material so as to induction-heat an inner circumferential side region of the ring material, and
a temperature of the outer circumferential region of the ring material which is induction-heated by the outer circumferential side induction heating element, is set to be higher than a temperature of the inner circumferential side region of the ring material which is induction-heated by the inner circumferential side induction heating element.

* * * * *

UNITED STATES PATENT AND TRADEMARK OFFICE
CERTIFICATE OF CORRECTION

PATENT NO. : 11,135,642 B2
APPLICATION NO. : 15/779760
DATED : October 5, 2021
INVENTOR(S) : Murai et al.

Page 1 of 1

It is certified that error appears in the above-identified patent and that said Letters Patent is hereby corrected as shown below:

In the Specification

Column 9, Line 64: Please correct "angle 4)" to read -- angle $\phi$ --

Column 17, Line 23: Please correct "portion if" to read -- portion $1f$ --

Column 17, Line 27: Please correct "portion if" to read -- portion $1f$ --

Column 17, Line 28: Please correct "portion if" to read -- portion $1f$ --

Column 17, Line 34: Please correct "portion if" to read -- portion $1f$ --

Column 22, Line 23: Please correct "axis $1b$" to read -- axis $11b$ --

Column 23, Line 7: Please correct "axis $1b$" to read -- axis $11b$ --

Column 24, Line 7: Please correct "portion $1c$" to read -- portion $11c$ --

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*